(12) United States Patent
Shimamoto et al.

(10) Patent No.: US 8,509,042 B2
(45) Date of Patent: Aug. 13, 2013

(54) OPTICAL DISC APPARATUS, FOCUS CONTROL METHOD AND INTEGRATED CIRCUIT

(75) Inventors: Takeshi Shimamoto, Osaka (JP); Takeharu Yamamoto, Osaka (JP); Takashi Kishimoto, Nara (JP)

(73) Assignee: Panasonic Corporation, Osaka (JP)

( * ) Notice: Subject to any disclaimer, the term of this patent is extended or adjusted under 35 U.S.C. 154(b) by 190 days.

(21) Appl. No.: 12/992,983

(22) PCT Filed: Mar. 8, 2010

(86) PCT No.: PCT/JP2010/001598
§ 371 (c)(1),
(2), (4) Date: Nov. 16, 2010

(87) PCT Pub. No.: WO2010/106755
PCT Pub. Date: Sep. 23, 2010

(65) Prior Publication Data
US 2011/0075529 A1 Mar. 31, 2011

(30) Foreign Application Priority Data
Mar. 17, 2009 (JP) .................................. 2009-063849

(51) Int. Cl.
*G11B 7/00* (2006.01)

(52) U.S. Cl.
USPC ...................................................... 369/44.28

(58) Field of Classification Search
None
See application file for complete search history.

(56) References Cited

U.S. PATENT DOCUMENTS

| 6,756,574 | B2 | 6/2004 | Higuchi | |
|---|---|---|---|---|
| 7,283,435 | B2 * | 10/2007 | Kuze et al. | ................. 369/44.23 |
| 7,778,136 | B2 * | 8/2010 | Yuzuki | ............................ 369/94 |
| 2002/0027842 | A1 | 3/2002 | Komma et al. | |
| 2002/0195540 | A1 | 12/2002 | Higuchi | |
| 2003/0007431 | A1 | 1/2003 | Tateishi | |
| 2007/0274166 | A1 | 11/2007 | Imagawa | |
| 2008/0175124 | A1 | 7/2008 | Kikukawa et al. | |

FOREIGN PATENT DOCUMENTS

| JP | 2002-157750 | 5/2002 |
|---|---|---|
| JP | 2003-16660 | 1/2003 |
| JP | 2003-22545 | 1/2003 |
| JP | 2007-207316 | 8/2007 |
| JP | 3995993 | 8/2007 |

(Continued)

OTHER PUBLICATIONS

International Search Report issued Apr. 13, 2010 in International (PCT) Application No. PCT/JP2010/001598.

*Primary Examiner* — Joseph Feild
*Assistant Examiner* — Parul Gupta
(74) *Attorney, Agent, or Firm* — Wenderoth, Lind & Ponack, L.L.P.

(57) ABSTRACT

An optical disc apparatus has: a spherical aberration correction unit (7) which corrects the spherical aberration generated in a light spot on a recording layer; a control unit (52) which focuses a light beam on a predetermined recording layer, and shifts the focal point position of the light beam from the current recording layer to another recording layer; and a focus jump control unit (60) which controls correction of spherical aberration and shift of the focal point position based on the interlayer distance between the current recording layer and a recording layer which adjoins in a direction opposite to a direction of shifting the focal point position of the light beam. By this configuration, focus jump is stably executed.

17 Claims, 14 Drawing Sheets

(56) References Cited

FOREIGN PATENT DOCUMENTS

| | | |
|---|---|---|
| JP | 2008-152830 | 7/2008 |
| JP | 2008-305490 | 12/2008 |
| JP | 2009-15878 | 1/2009 |

* cited by examiner

OPTICAL DISC APPARATUS, FOCUS CONTROL METHOD AND INTEGRATED CIRCUIT

TECHNICAL FIELD

The present invention relates to an optical disc apparatus which records and reproduces information by irradiating an optical beam onto a recording surface of an optical disc having by a plurality of layers, a focus control method for controlling focus of an optical beam which is irradiated onto an optical disc, and an integrated circuit for controlling focus of an optical beam which is irradiated onto an optical disc.

BACKGROUND ART

Available methods for increasing the recording capacity of an optical disc are: increasing density of an optical disc and using multi-recording layers.

For example, in a Blu-ray disc, the recording capacity of one optical disc is increased to 50 GB by increasing the numerical aperture (NA) of an objective lens from 0.6 to 0.85 and decreasing the wavelength of the laser from 650 nm to 405 nm, so that density is increased, and by making the recording layer two layers.

Recently in order to increase capacity even more, development of a multilayer optical disc having a higher number of recording layers is in-progress.

When the NA is high and the wavelength is short, it is known that the recording and reproducing performance greatly deteriorates due to spherical aberration, which is generated depending on the thickness from the surface of the optical disc to each recording layer, where correction of the spherical aberration is indispensable.

In order to implement good recording and reproducing in each recording layer, it is necessary to correct spherical aberration to an optimum state in each recording layer.

During this spherical aberration correction operation, an operation of changing the focal point position of the light beam, from the current recording layer to another recording layer, may be performed. This operation of changing the focal point position of the light beam from the current layer to another recording layer is generally called a "focus jump".

Spherical aberration not only deteriorates the recording and reproducing performance, but also deteriorates the quality of servo signals, which are used for focus control and tracking control.

In order to perform a stable focus jump operation in a multilayer optical disc having a plurality of recording layers, some methods related to the procedure for spherical aberration correction and focus jump were proposed.

A technology disclosed in Patent Literature 1, for example, is that spherical aberration is corrected prior to focus jump, so that an optimum state is generated at a mid-position between the current recording layer and a target recording layer at a shift destination, and spherical aberration is corrected again after the focus jump is executed so that an optimum state is generated in the target recording layer at the shift destination. According to Patent Literature 1, a stable focus jump operation can be implemented by this procedure.

A technology disclosed in Patent Literature 2 is that spherical aberration is corrected prior to focus jump, so that an optimum state is generated in a target recording layer at a shift destination, then the focus jump is executed. According to Patent Literature 2, stable focus jump operation can be implemented by this procedure.

A multilayer optical disc structure, as shown in Patent Literature 3, was proposed as a means of further increasing the capacity of optical discs using these technologies.

However with conventionally proposed methods, it is difficult to implement a stable interlayer shift if the number of layers of an optical disc is further increased.

In the case of a multilayer optical disc, the following restrictions are imposed on the layer structure.

(1) In order to ensure the protection of the recording and reproducing performance against dust and fingerprints which adhere to the surface where a light beam enters, at least 50 μm or more of thickness is required between the surface and the recording layer closest to the surface.

(2) Since the tilt margin must be ensured, the thickness between the surface and the recording layer that is most distant from the surface cannot be increased very much. For example, in the case of a Blu-ray disc, the thickness between the surface and the recording layer that is most distant from the surface is 100 μm.

(3) The interlayer distance between each recording layer cannot be the same. (If the interlayer distance among recording layers is the same, the reflected light from the focused recording layer and the reflected light from the rear face of the recording layer, which is two layers away from the focused recording layer, interfere.)

(4) The interlayer distance between each recording layer cannot be too short. (The shortest interlayer distance is about 10 μm, otherwise the interference from the adjacent recording layers increases.)

Therefore if it is attempted to implement an optical disc having four recording layers, the interlayer distance among recording layers becomes uneven, as shown in the layer structure in FIG. 11. FIG. 11 is a diagram depicting the layer structure of a multilayer optical disc.

The optical disc 31 shown in FIG. 11 comprises: a first recording layer L0 which is most distant from a surface 201 where a light beam enters, a second recording layer L1 which is the second most distant from the surface 201, a third recording layer L2 which is the third most distant from the surface 201, a fourth recording layer L3 which is closest to the surface 201, a cover layer 203 which is disposed between the fourth recording layer L3 and the surface 201, a first intermediate layer 204 which is disposed between the third recording layer L2 and the fourth recording layer L3, a second intermediate layer 205 which is disposed between the second recording layer L1 and the third recording layer L2, a third intermediate layer 206 which is disposed between the first recording layer L0 and the second recording layer L1, and a fourth intermediate layer 207 which is disposed between the first recording layer L0 and a label layer 202.

A recording layer which is most distant from the side which the light beam enters is called the first recording layer L0, and the other recording layers are called, in order from the first recording layer L0 to the surface of the optical disc, the second recording layer L1, the third recording layer L2 and the fourth recording layer L3. For example, the interlayer distance between the first recording layer L0 and the second recording layer L1 is 17 μm, the interlayer distance between the second recording layer L1 and the third recording layer L2 is 20 μm, the interlayer distance between the third recording layer L2 and the fourth recording layer L3 is 13 μm, and the interlayer distance between the fourth recording layer L3 and the surface 201 is 50 μm.

For example, Patent Literature 3 proposes a layer structure of a multilayer optical disc having four recording layers. FIG. 12A to FIG. 12D show the focus error signals obtained when the light beam enters this multilayer optical disc.

FIG. 12A to FIG. 12D are graphs showing the focus error signals which are detected when the spherical aberration is optimized for each recording layer of a multilayer optical disc. FIG. 12A is a graph showing a focus error signal acquired in a state where the spherical aberration is optimized for the first recording layer L0, FIG. 12B is a graph showing a focus error signal acquired in a state where the spherical aberration is optimized for the second recording layer L1, FIG. 12C is a graph showing a focus error signal acquired in a state where the spherical aberration is optimized for the third recording layer L2, and FIG. 12D is a graph showing a focus error signal acquired in a state where the spherical aberration is optimized for the fourth recording layer L3.

In FIG. 12A to FIG. 12D, the focus error signal 301 is a focus error signal corresponding to the first recording layer L0, the focus error signal 302 is a focus error signal corresponding to the second recording layer L1, the focus error signal 303 is a focus error signal corresponding to the third recording layer L2, and the focus error signal 304 is a focus error signal corresponding to the fourth recording layer L3.

Throughout all of FIG. 12A to FIG. 12D, a focus error signal in a recording layer, for which spherical aberration is not optimized, greatly deteriorates, so stable focus control cannot be implemented in this state.

Now a conventionally proposed method for interlayer shift from the third recording layer L2 to the second recording layer L1 is described. Before the interlayer shift, the focus error signal 303, corresponding to the third recording layer L2, can be sufficiently acquired, as shown in FIG. 12C, so stable focus control can be implemented. When the interlayer shift is performed, the spherical aberration is adjusted to an optimum state for the second recording layer L1, which is the target recording layer at the shift destination. In this state, the focus error signal 302, corresponding to the second recording layer L1, can be sufficiently acquired as shown in FIG. 12B.

At this point however, focus is still controlled to be on the third recording layer L2. Hence as shown in FIG. 12B, the symmetry of the focus error signal 303, corresponding to the third recording layer L2, is greatly affected. The reasons are as follows.

First the interlayer distance between the second recording layer L1 and the third recording layer L2 is long, so if the spherical aberration is adjusted to an optimum level for the second recording layer L1, the focus error signal of the third recording layer L2 deteriorates.

Second the interlayer distance between the third recording layer L2 and the fourth recording layer L3 is short, so the respective focus error signals adjacent to each other interfere, and amplitude deteriorates.

In such a state, it is difficult to implement stable focus control, and if offset voltage is generated in the focus error signals or if such disturbance as impact occurs during the operation, the focus jump operation becomes unstable, and focus control may be lost.

A configuration of a conventional optical disc apparatus will be described with reference to FIG. 13. FIG. 13 is a diagram depicting a configuration of a conventional optical disc apparatus.

The optical disc apparatus in FIG. 13 comprises an optical pickup 11, a focus actuator drive circuit 21, a tracking actuator drive circuit 22, a spherical aberration correction actuator drive circuit 23, a focus error signal generator 25, a tracking error signal generator 26, an RF signal generator 27, a reproducing signal quality index generator 28, a disc motor 29, a microcomputer 51 and a control unit 52.

The optical pickup 11 irradiates a light beam onto an optical disc 31, and reads information recorded on the optical disc 31. Or the optical pickup 11 irradiates a light beam onto an optical disc 31, and records information on the optical disc 31. The focus actuator drive circuit 21 displaces an objective lens 1 of the optical pickup 11 to be approximately vertical to the optical disc 31.

The optical disc apparatus shown in FIG. 13 records information on the optical disc 31 or reproduces information recorded on the optical disc 31. First light beams emitted from a laser light source 9, disposed on the optical pickup 11, become parallel beams by a collimator lens 8. These parallel beams pass through a spherical aberration correction unit 7, polarization beam splitter 10 and a ¼ wavelength plate 6, and converge on an information recording surface (recording film) of the optical disc 31 by the objective lens 1.

The reflected light from the optical disc 31 transmits through the objective lens 1 and the ¼ wavelength plate 6, and is then reflected by the polarization beam splitter 10 and reaches a light receiving unit 5. Here the optical disc 31 is rotary-driven by the disc motor 29.

The light receiving unit 5 converts the reflected light from the optical disc 31 into an electric signal. The output of the light receiving unit 5 is supplied to the focus error signal generator 25, tracking error signal generator 26 and RF signal generator 27.

The focus error signal generator 25 detects a positional shift between the focus position of the light beam irradiated onto the optical disc 31 and the information recording surface of the optical disc 31 based on the output of the light receiving unit 5, and outputs the detected positional shift as a focus error signal. The focus error signal can be generated by an astigmatism method, for example.

The tracking error signal generator 26 detects a positional shift between a spot of the light beam formed on the information recording surface of the optical disc 31 and a track on the information recording surface of the optical disc 31 based on the output of the light receiving unit 5, and outputs the detected positional shift as a tracking error signal. The tracking error signal can normally be generated by a push-pull method, for example.

The focus error signal and the tracking error signal are supplied to the control unit 52. The control unit 52 performs such signal processings as phase compensation on the focus error signal and tracking error signal, so as to generate control signals.

The focus actuator drive circuit 21 drives the focus actuator 2 disposed on the optical pickup 11 by supplying a drive signal to the focus actuator 2 according to a control signal from the control unit 52. The tracking actuator drive circuit 22 drives the tracking actuator 3 disposed on the optical pickup 11 by supplying a drive signal to the tracking actuator 3 according to a control signal from the control unit 52.

The focus actuator 2 drives an objective lens 1 according to a drive signal from the focus actuator drive circuit 21. The tracking actuator 3 also drives the objective lens 1 according to a drive signal from the tracking actuator drive circuit 22.

In this way, the control unit 52 forms a servo loop for focus control by controlling the focus actuator drive circuit 21 for driving the focus actuator 2, according to the focus error signal. Furthermore, the control unit 52 forms a servo loop for tracking control by controlling the tracking actuator drive circuit 22 for driving the tracking actuator 3 according to the tracking error signal. In this way servo control is executed.

The RF signal generator 27 generates an RF signal based on the output of the light receiving unit 5, and outputs the RF signal to the reproducing signal quality index generator 28. The reproducing signal quality index generator 28 generates a reproducing signal quality index which indicates the reproducing performance of the reproducing signal based on the RF signal acquired from the RF signal generator 27. The reproducing signal quality index is, for example, a jitter or an error rate. The reproducing signal quality index generated by the reproducing signal quality index generator 28 is supplied to the microcomputer 51.

The spherical aberration correction actuator drive circuit 23 corrects spherical aberration by supplying a drive signal to the spherical aberration correction unit 7 according to a control signal from the microcomputer 51. The correction amount of the spherical aberration can be determined according to the distance from the surface of the optical disc to each recording layer which is specified by the optical disc standard, for example.

The microcomputer 51 supplies a drive command value for performing the focus jump operation to the control unit 52. A drive signal based on this drive command value is supplied to the focus actuator drive circuit 21, and the focus actuator 2 starts driving.

Now the procedure of the focus jump operation from the third recording layer L2 to the second recording layer L1 will be described with reference to FIG. 14. FIG. 14 is a graph showing changes of the focus error signal 401, focus actuator drive output 402 and the signal 403 to indicate the spherical aberration correction amount in the case of a conventional interlayer shift. A state L420 shows a state where the spherical aberration corresponding to the first recording layer L0 is the optimum, a state L421 is a state where the spherical aberration corresponding to the second recording layer L1 is the optimum, the state L422 shows a state where the spherical aberration corresponding to the third recording layer L2 is the optimum, and the state L423 shows a state where the spherical aberration corresponding to the fourth recording layer L3 is the optimum. The initial state of a signal 403, to indicate the spherical aberration correction amount, is the state L422.

First at the timing T101, the spherical aberration correction amount is in state L422 when the recording or reproducing operation is being executed on the third recording layer L2. Then at the timing T102, the optical disc apparatus starts the spherical aberration correction operation. From the timing T102 to the timing T104, the optical disc apparatus adjusts the spherical aberration correction amount from the state L422 to the state L421, while continuing the focus control operation. However at the timing T103, while changing the spherical aberration correction amount from the state L422 to the state L421, focus control is lost. As a result, at the timing T105, the spot position of the light beam passes the surface of the optical disc, and the focus jump operation fails.

This is because, as described in FIG. 12B, when the spherical aberration correction amount is the optimum for the second recording layer L1, the focus error signal obtained from the third recording layer L2 becomes extremely asymmetric, and the stability of focus control versus axial run-out or disturbance of the optical disc drops.

As a result, the recording and reproducing operations for a desired recording layer may become impossible in a multilayer optical disc, so a stable focus jump method is demanded.

Furthermore, in the case of a multilayer optical disc, an increase in the number of recording layers widens the distance from a recording layer closest to the surface to a recording layer most distant from the surface, so spherical aberration must be corrected in a wide range corresponding to this interlayer distance. A generally used method to implement spherical aberration correction in such a wide range is moving the spherical aberration correction element by a stepping motor. However the size of the optical pickup is limited, and it is difficult to enclose a high output stepping motor, which size is large, in the optical pickup. Therefore a stepping motor for driving the spherical aberration correction element must be small and have low output, and in this case, it is difficult to increase the driving speed of the spherical aberration correction element. Additionally, drive control by the stepping motor is normally performed with a trapezoidal speed profile, in which acceleration or deceleration is performed gradually, in order to prevent a loss of synchronization, so the driving time becomes long if driving and stopping are performed continuously.

In the conventionally proposed focus jump procedure, a continuous interlayer shift among a plurality of recording layers in a multilayer optical disc is not considered. Hence in a four-layer disc, for example, the conventional focus jump procedure must be repeated a maximum of three times. But as mentioned above, it is difficult to increase the driving speed of the stepping motor which drives the spherical aberration correction element. Therefore the spherical aberration correction operation takes time, and the interlayer access time in a multilayer optical disc increases. If the interlayer access time increases, video images may be interrupted during the reproducing of a video image, which is not desirable. As a consequence, increasing the speed of interlayer access is demanded for multilayer optical discs.

CITATION LIST

Patent Literature

Patent Literature 1: Japanese Patent No. 3995993
Patent Literature 2: Japanese Patent No. 4217395
Patent Literature 3: Japanese Patent Application Laid-Open No. 2008-152830

SUMMARY OF INVENTION

With the foregoing in view, it is an object of the present invention to provide an optical disc apparatus, a focus control method and an integrated circuit which can implement a stable performing focus jump.

An optical disc apparatus according to an aspect of the present invention is an optical disc apparatus which irradiates a light beam onto an optical disc having a plurality of recording layers so as to read information recorded on the optical disc or record information on the optical disc, the optical disc apparatus comprising: a spherical aberration correction unit which corrects spherical aberration generated in a light spot on each of the recording layers; a focus control unit which focuses the light beam on a predetermined recording layer; a focus jump unit which shifts a focal point position of the light beam from a current recording layer to another recording layer; and a focus jump control unit which controls correction of spherical aberration by the spherical aberration correction unit and shift of the focal point position by the focus jump unit based on the interlayer distance between the current recording layer and a recording layer which adjoins in the direction the opposite to the direction of shifting the focal point position of the light beam.

According to this configuration, correction of the spherical aberration generated in a light spot on the recording layer and the shift of the focal point position of the light beam are controlled based on the interlayer distance between the current recording layer and the recording layer which adjoins in the direction the opposite to the direction of shifting the focal point position of the light beam.

According to the present invention, the correction of spherical aberration and the shift of the focal point position are controlled based on the interlayer distance between the current recording layer and the recording layer which adjoins in the direction the opposite to the direction of shifting the focal point position of the light beam, so the influence of the adjacent recording layers on the focus error signal can be considered, and focus jump can be performed stably.

The objects, features and advantages of the present invention will become more apparent upon reading the following detailed description along with the accompanying drawings.

DESCRIPTION OF EMBODIMENTS

Embodiments of the present invention will now be described with reference to the drawings. The following embodiments are examples upon embodying the present invention, and are not intended to restrict the technical scope of the invention.

Embodiment 1

Figure 1:
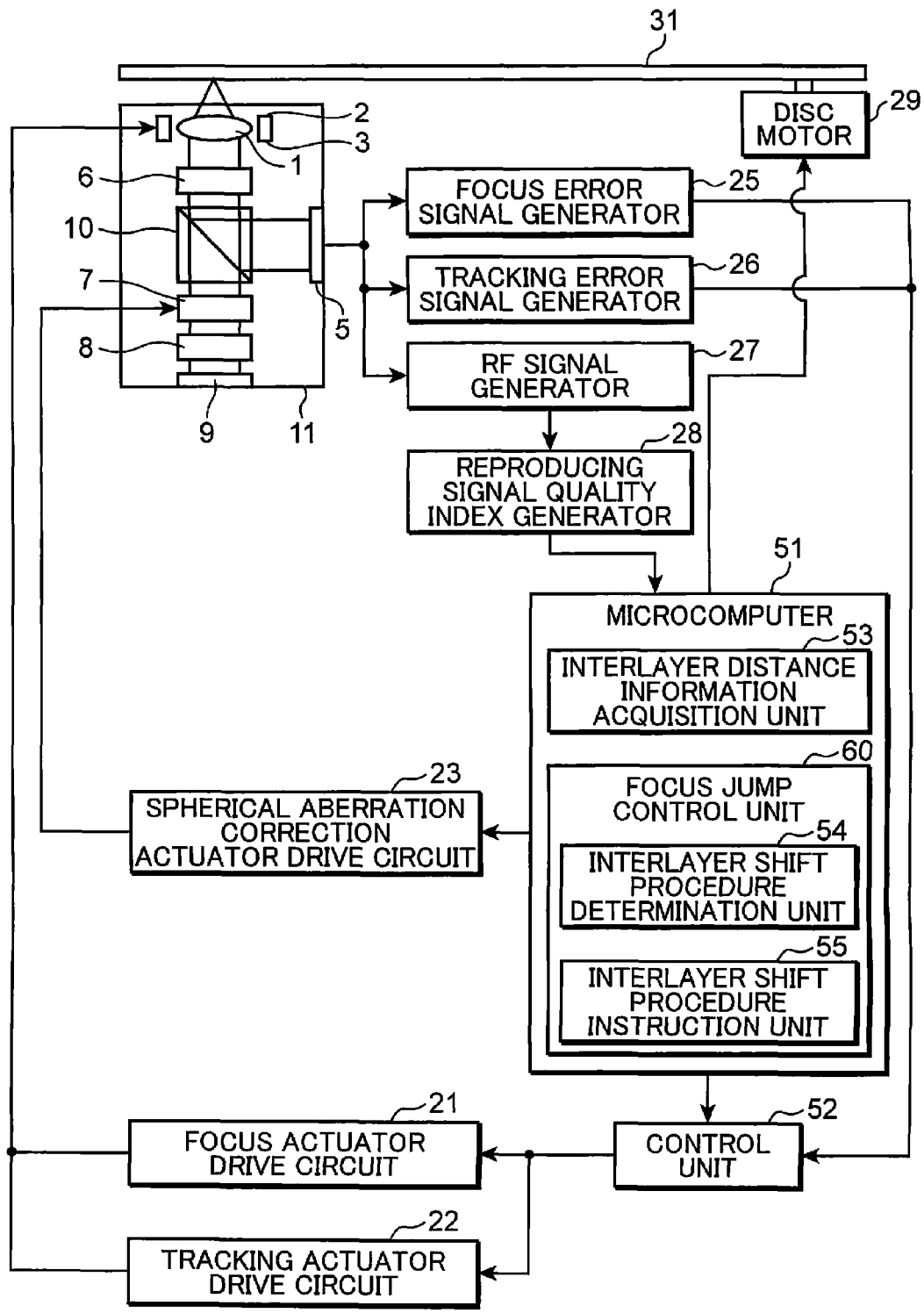
FIG. 1 is a block diagram depicting a configuration of an optical disc apparatus according to Embodiment 1 of the present invention.

FIG. 1 is a block diagram depicting a configuration of an optical disc apparatus according to Embodiment 1 of the present invention.

The optical disc apparatus in FIG. 1 has an optical pickup 11, focus actuator drive circuit 21, tracking actuator drive circuit 22, spherical aberration correction actuator drive circuit 23, focus error signal generator 25, tracking error signal generator 26, RF signal generator 27, reproducing signal quality index generator 28, disc motor 29, microcomputer 51 and control unit 52. The optical pickup 11 has an objective lens 1, focus actuator 2, tracking actuator 3, light receiving unit 5, ¼ wavelength plate 6, spherical aberration correction unit 7, collimator lens 8, laser light source 9 and polarization beam splitter 10.

The optical pickup 11 irradiates a light beam onto an optical disc 31, and reads information recorded on the optical disc 31. Or the optical pickup 11 irradiates a light onto the optical disc 31, and records information on the optical disc 31. The focus actuator drive circuit 21 displaces the objective lens 1 of the optical pickup 11 in an approximately vertical direction (optical axis direction) to the optical disc 31.

The optical disc apparatus shown in FIG. 1 records information on the optical disc 31 or reads information recorded on the optical disc 31 by irradiating the light beam onto the optical disc 31 which has a plurality of recording layers. First light beams, which are emitted from the laser light source 9 disposed on the optical pickup 11, become parallel beams by the collimator lens 8. The parallel beams pass through the spherical aberration correction unit 7, polarization beam splitter 10 and ¼ wavelength plate 6, and are converged on an information recording surface (recording film) of the optical disc 31 by the objective lens 1.

The reflected light from the optical disc 31 transmits through the objective lens 1 and the ¼ wavelength plate 6, and is then reflected by the polarization beam splitter 10 and reaches a light receiving unit 5. Here the optical disc 31 is rotary-driven by the disc motor 29.

The light receiving unit 5 converts the reflected light from the optical disc 31 into an electric signal. The output of the light receiving unit 5 is supplied to the focus error signal generator 25, tracking error signal generator 26 and RF signal generator 27.

The focus error signal generator 25 detects a positional shift between the focus position of the light beam irradiated onto the optical disc 31 and the information recording surface of the optical disc 31, based on the output of the light receiving unit 5, and outputs the detected positional shift as a focus error signal. The focus error signal can be generated by an astigmatism method, for example.

The tracking error signal generator 26 detects a positional shift between a spot of the light beam formed on the information recording surface of the optical disc 31 and a track on the information recording surface of the optical disc 31 based on the output of the light receiving unit 5, and outputs the detected positional shift as a tracking error signal. The tracking error signal can normally be generated by a push-pull method, for example.

The focus error signal and tracking error signal are supplied to the control unit 52. The control unit 52 performs such signal processings as phase compensation on the focus error signal and tracking error signal, and generates control signals for controlling the focus actuator drive circuit 21 and the tracking actuator drive circuit 22.

The control unit 52 focuses the light beam on a predetermined recording layer. The control unit 52 also shifts the focal point position of the light beam from the current recording layer to another recording layer.

The focus actuator drive circuit 21 drives the focus actuator 2 disposed on the optical pickup 11 by supplying a drive signal to the focus actuator 2 according to a control signal from the control unit 52. The tracking actuator drive circuit 22 drives the tracking actuator 3 disposed on the optical pickup 11 by supplying a drive signal to the tracking actuator 3 according to a control signal from the control unit 52.

The focus actuator 2 drives an objective lens 1 according to a drive signal from the focus actuator drive circuit 21. The tracking actuator 3 also drives the objective lens 1 according to a drive signal from the tracking actuator drive circuit 22.

In this way, the control unit 52 forms a servo loop for focus control by controlling the focus actuator drive circuit 21 for driving the focus actuator 2, according to the focus error signal. Furthermore, the control unit 52 forms a servo loop for tracking control by controlling the tracking actuator drive circuit 22 for driving the tracking actuator 3 according to the tracking error signal. In this way servo control is executed.

The RF signal generator 27 generates an RF signal based on the output of the light receiving unit 5, and outputs the RF signal to the reproducing signal quality index generator 28. The reproducing signal quality index generator 28 generates a reproducing signal quality index which indicates the reproducing performance of the reproducing signal based on the RF signal acquired from the RF signal generator 27. The reproducing signal quality index is, for example, a jitter or error rate. The reproducing signal quality index generated by the reproducing signal quality index generator 28 is supplied to the microcomputer 51.

The spherical aberration correction actuator drive circuit 23 corrects spherical aberration by supplying a drive signal to the spherical aberration correction unit 7 according to a control signal from the microcomputer 51. The correction amount of the spherical aberration can be determined according to the distance from the surface of the optical disc to each recording layer which is specified by the multilayer optical disc standard, for example.

The spherical aberration correction unit 7 corrects spherical aberration which is generated in the light spot on the recording layer by shifting the spherical aberration correction element (e.g. collimator lens) by the stepping motor. The spherical aberration correction unit 7 is not limited to the collimator lens and stepping motor. The spherical aberration correction unit 7 may correct the spherical aberration by liquid crystals.

The microcomputer 51 supplies a drive command value for performing the focus jump operation to the control unit 52. A drive signal based on this drive command value is supplied to the focus actuator drive circuit 21, and the focus actuator 2 starts driving.

The microcomputer 51 also has an interlayer distance information acquisition unit 53 and a focus jump control unit 60. The interlayer distance information acquisition unit 53 acquires the interlayer distance information of each recording layer of the optical disc 31.

The focus jump control unit 60 controls the correction of spherical aberration by the spherical aberration correction actuator drive circuit 23 and the shift of the focal point position by the focus actuator drive circuit 21 based on the interlayer distance between the current recording layer and a recording layer which adjoins in the direction the opposite to the direction of shifting the focal point position of the light beam, acquired by the interlayer distance information acquisition unit 53.

The focus jump control unit 60 also controls the correction of spherical aberration by the spherical aberration correction actuator drive circuit 23 and shift of the focal point position by the focus actuator drive circuit 21 based on the interlayer distance between the current recording layer and a recording layer which exists in a predetermined distance range before or after the current recording layer.

The focus jump control unit 60 has an interlayer shift procedure determination unit 54 and an interlayer shift procedure instruction unit 55.

The interlayer shift procedure determination unit 54 determines which one of the correction of spherical aberration by the spherical aberration correction actuator drive circuit 23 and the shift of the focal point position by the focus actuator drive circuit 21 is executed first, based on the interlayer distance between the current recording layer and a recording layer which adjoins in the direction the opposite to the direction of shifting the focal point position of the light beam, which is acquired by the interlayer distance information acquisition unit 53. In other words, the interlayer shift procedure determination unit 54 determines a procedure to output a drive command value for performing the focus jump operation which is supplied to the control unit 52 and a drive signal which is supplied to the spherical aberration correction actuator drive circuit 23 based on the interlayer distance information acquired by the interlayer distance information acquisition unit 53.

Based on the determination result of the interlayer shift procedure determination unit 54, the interlayer shift procedure instruction unit 55 outputs a drive signal to the control unit 52 and the spherical aberration correction actuator drive circuit 23. In other words, if the interlayer shift procedure determination unit 54 determines to execute the correction of the spherical aberration first, the interlayer shift procedure instruction unit 55 instructs the spherical aberration correction actuator drive circuit 23 to correct the spherical aberration which is generated in the light spot on the recording layer at the shift destination. Then the interlayer shift procedure instruction unit 55 instructs the control unit 52 to shift the focal point position of the light beam from the current recording layer to another recording layer.

If the interlayer shift procedure determination unit 54 determines to execute the focus jump operation first, the interlayer shift procedure instruction unit 55 instructs the control unit 52 to shift the focal point position of the light beam from the current recording layer to another recording layer. Then the interlayer shift procedure instruction unit 55 instructs the spherical aberration correction actuator drive circuit 23 to correct spherical aberration generated in the light spot on the recording layer at the shift destination.

It is preferable that the control unit 52 and the microcomputer 51 are constituted by one or more digital circuits. The control unit 52 and the microcomputer 51 maybe integrated on a single semiconductor integrated circuit substrate (single semiconductor chip).

In Embodiment 1, the spherical aberration correction unit 7 and the spherical aberration correction actuator drive circuit 23 correspond to an example of the spherical aberration correction unit, the focus actuator drive circuit 21 and the control unit 52 correspond to an example of the focus control unit, the focus actuator drive circuit 21 and the control unit 52 correspond to an example of the focus jump unit, the interlayer distance information acquisition unit 53 corresponds to an example of the interlayer distance acquisition unit, the focus jump control unit 60 corresponds to an example of the focus jump control unit, and the focus actuator drive circuit 21 corresponds to an example of the drive unit.

Figure 11:
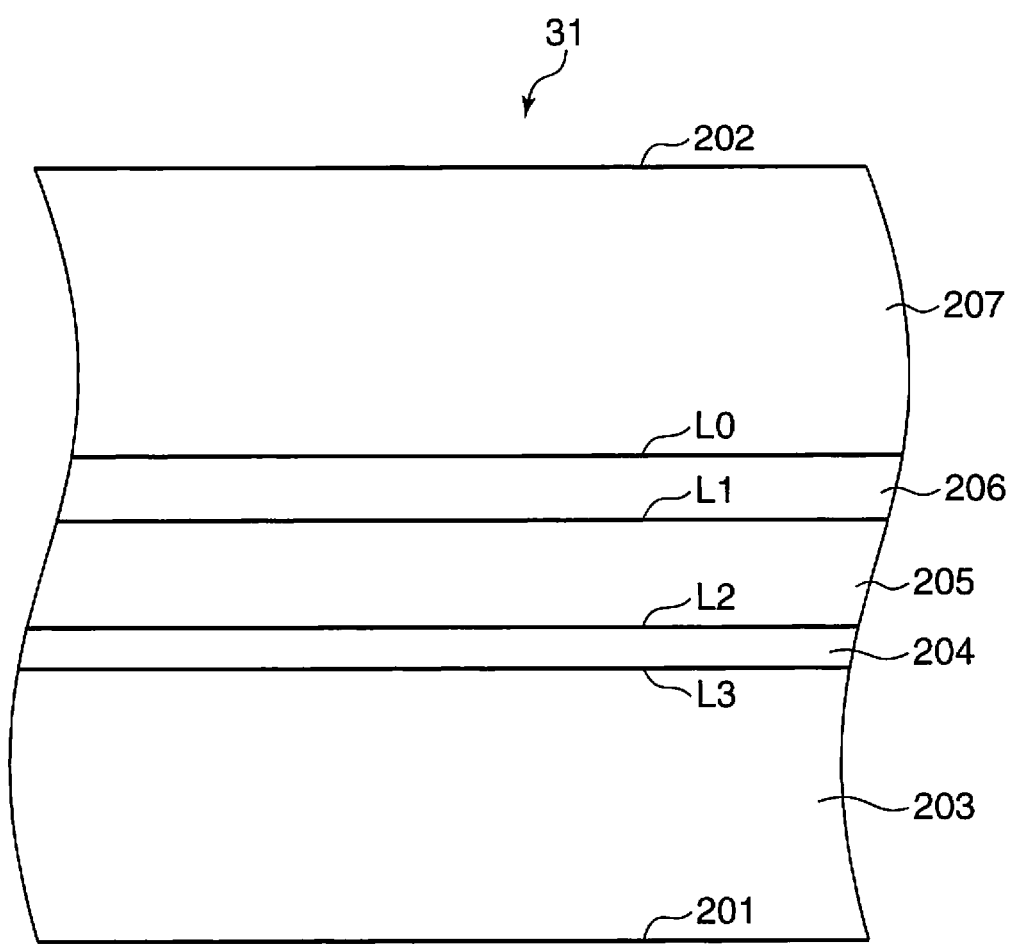
FIG. 11 is a diagram depicting a layer structure of a multilayer optical disc.

Now a detailed structure of the optical disc 31 will be described with reference to FIG. 11. In this description, it is assumed that the optical disc 31 is a four-layer optical disc which has four recording layers.

The optical disc 31 has: a first recording layer L0 which is most distant from a surface 201 where a light beam enters, a second recording layer L1 which is the second most distant from the surface 201, a third recording layer L2 which is the third most distant from the surface 201, a fourth recording layer L3 which is closest to the surface 201, a cover layer 203 which is disposed between the fourth recording layer L3 and the surface 201, a first intermediate layer 204 which is disposed between the third recording layer L2 and the fourth recording layer L3, a second intermediate layer 205 which is disposed between the second recording layer L1 and the third recording layer L2, a third intermediate layer 206 which is disposed between the first recording layer L0 and the second recording layer L1, and a fourth intermediate layer 207 which is disposed between the first recording layer L0 and a label surface 202.

The cover layer 203, first intermediate layer 204, second intermediate layer 205, third intermediate layer 206 and fourth intermediate layer 207 are transparent.

The interlayer distance between each recording layer has restrictions for the following reasons.

(1) In order to ensure the protection of the recording and reproducing performance against dust and fingerprints which adhere to the surface where a light beam enters, at least 50 μm or more of thickness is required between the surface and the recording layer closest to the surface.

(2) Since the tilt margin must be insured, the thickness between the surface and the recording layer that is most distant from the surface cannot be increased very much. For example, in the case of a Blu-ray disc, the thickness between the surface and the recording layer that is most distant from the surface is 100 μm.

(3) The interlayer distance between each recording layer cannot be the same. (If the interlayer distance among recording layers is the same, the reflected light from the focused recording layer and the reflected light from the rear face of the recording layer, which is two layers away from the focused recording layer, interfere.)

(4) The interlayer distance between each recording layer cannot be too short. (The shortest interlayer distance is about 10 μm, otherwise the interference from the adjacent recording layers increases.)

Therefore the interlayer distance between each recording layer is uneven.

The interlayer distance between each layer fluctuates within the range where the above conditions (1) to (4) are satisfied, because of dispersion during manufacturing and the like. In the multilayer optical disc to be used for the following description, the distance between the first recording layer L0 and the surface 201 is 100 μm, the distance between the second recording layer L1 and the surface 201 is 83 μm, the distance between the third recording layer L2 and the surface 201 is 63 μm, and the distance between the fourth recording layer L3 and the surface 201 is 50 μm. In this case, the interlayer distance between the first recording layer L0 and the second recording layer L1 is 17 μm, the interlayer distance between the second recording layer L1 and the third recording layer L2 is 20 μm, the interlayer distance between the third recording layer L2 and the fourth recording layer L3 is 13 μm, and the interlayer distance between the fourth recording layer L3 and the surface 201 is 50 μm.

Figure 12A:
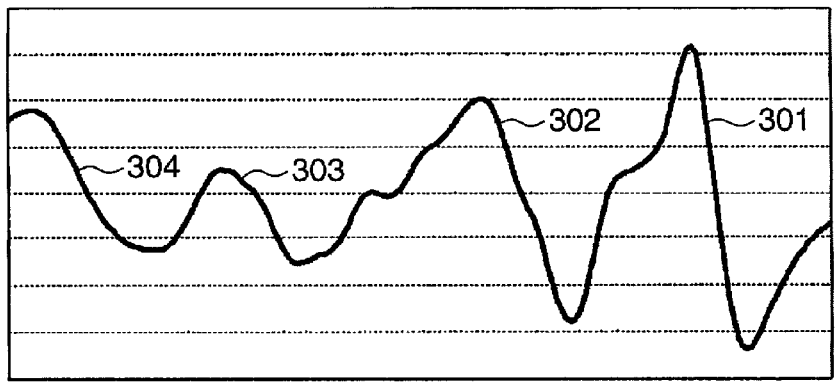
FIG. 12A is a graph showing a focus error signal which is acquired in a state where spherical aberration is optimized for the first recording layer.
Figure 12B:
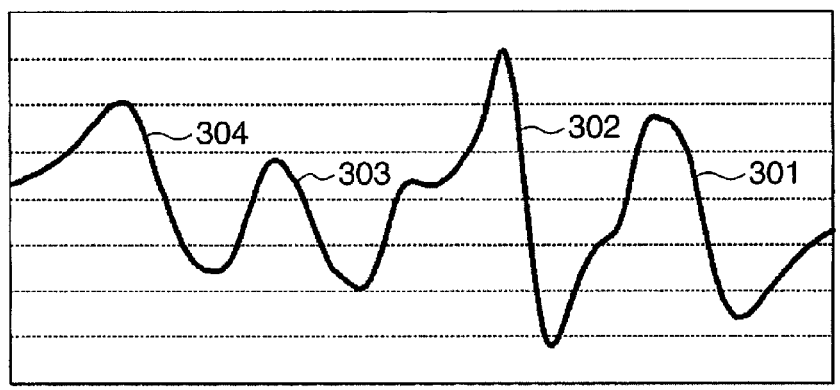
FIG. 12B is a graph showing a focus error signal which is acquired in a state where spherical aberration is optimized for the second recording layer.
Figure 12C:
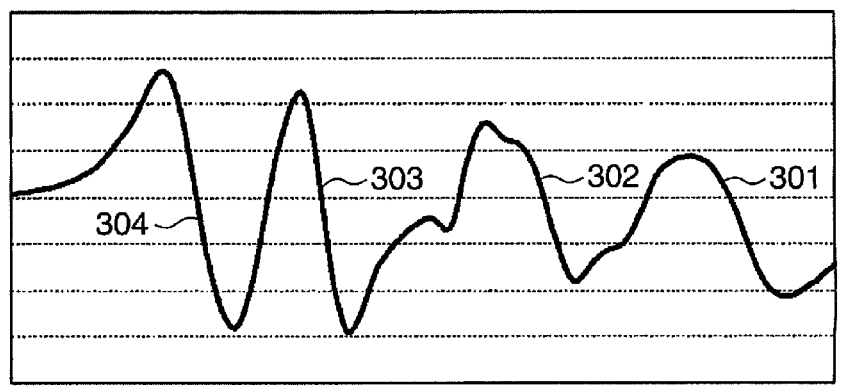
FIG. 12C is a graph showing a focus error signal which is acquired in a state where spherical aberration is optimized for the third recording layer.
Figure 12D:
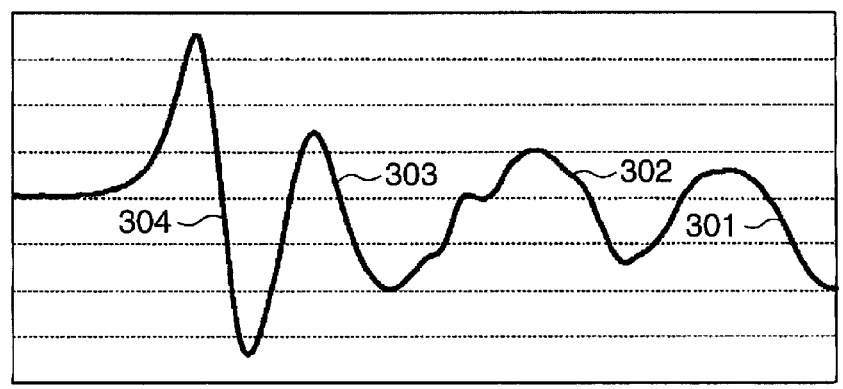
FIG. 12D is a graph showing a focus error signal which is acquired in a state where spherical aberration is optimized for the fourth recording layer.
Figure 13:
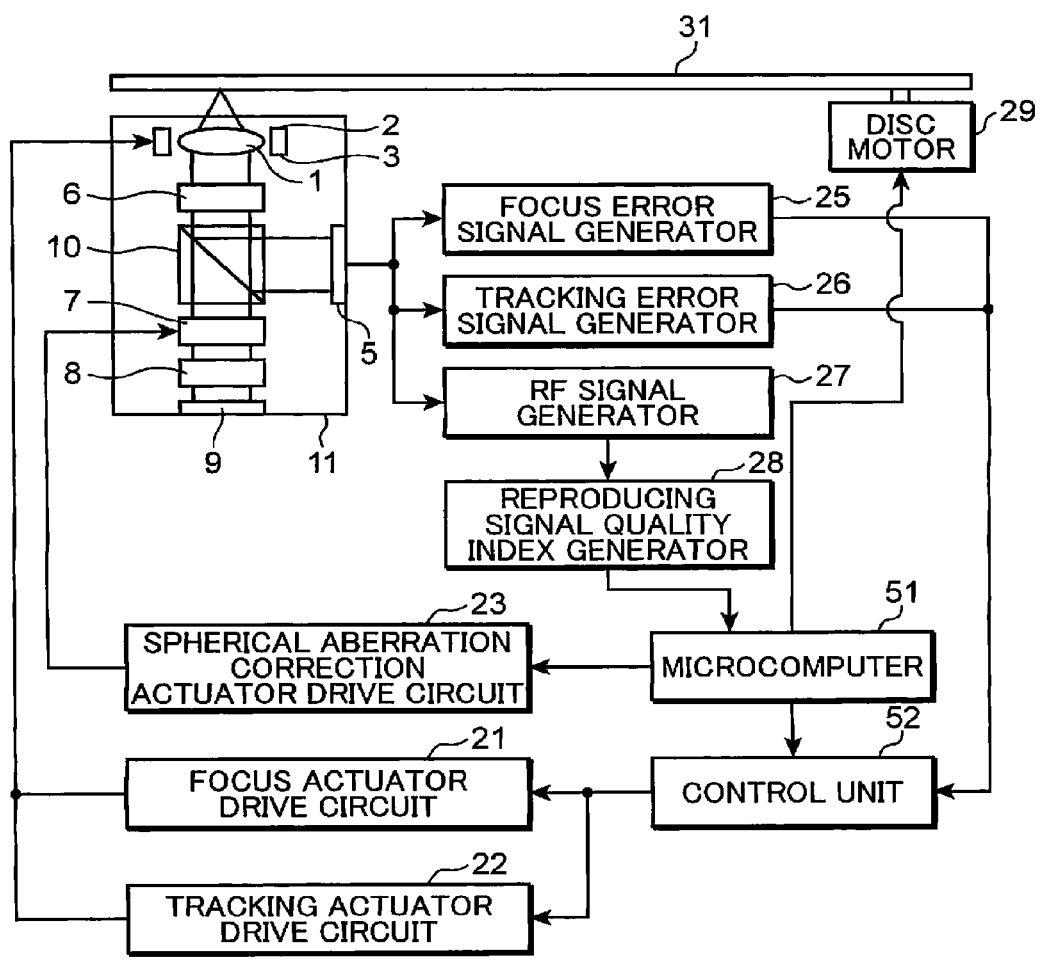
FIG. 13 is a block diagram depicting a configuration of a conventional optical disc apparatus.
Figure 14:
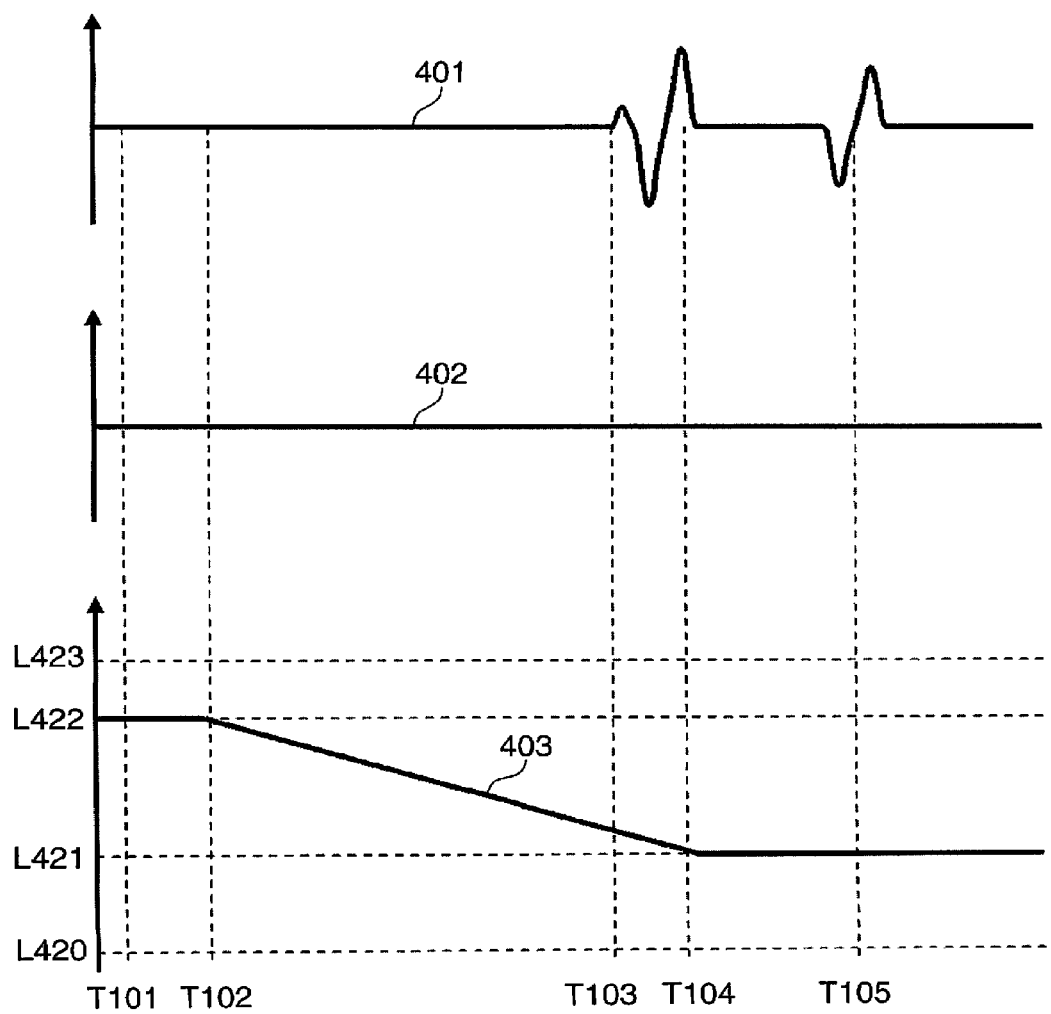
FIG. 14 are graphs showing the change of a focus error signal, focus actuator drive output, and a signal to indicate the spherical aberration correction amount upon a conventional interlayer shift.

In the optical disc having this layer structure, the focus error signals acquired when a light beam enters are shown in FIG. 12A to FIG. 12D. Here FIG. 12A is a graph showing a focus error signal acquired in a state where the spherical aberration is optimized for the first recording layer L0, where the amplitude of the focus error signal 301 of the first recording layer L0 is the largest. In the same manner, FIG. 12B is a graph showing a focus error signal acquired in a state where the spherical aberration is optimized for the second recording layer L1, FIG. 12C is a graph showing a focus error signal acquired in a state where the spherical aberration is optimized for the third recording layer L2, and FIG. 12D is a graph showing a focus error signal acquired in a state where the spherical aberration is optimized for the fourth recording layer L3.

A method for implementing a stable focus jump using a multilayer optical disc having this layer structure will be described. In concrete terms, the optical disc apparatus according to Embodiment 1 switches the procedure of the focus jump operation and the spherical aberration correction operation based on the interlayer distance between the current recording layer where the light beam is focused, and a recording layer which adjoins in the direction the opposite to the direction of shifting the focal point position of the light beam.

A procedure of the focus jump from the second recording layer L1 to the third recording layer L2 will be described with reference to FIG. 2 and FIG. 3.

Figure 2:
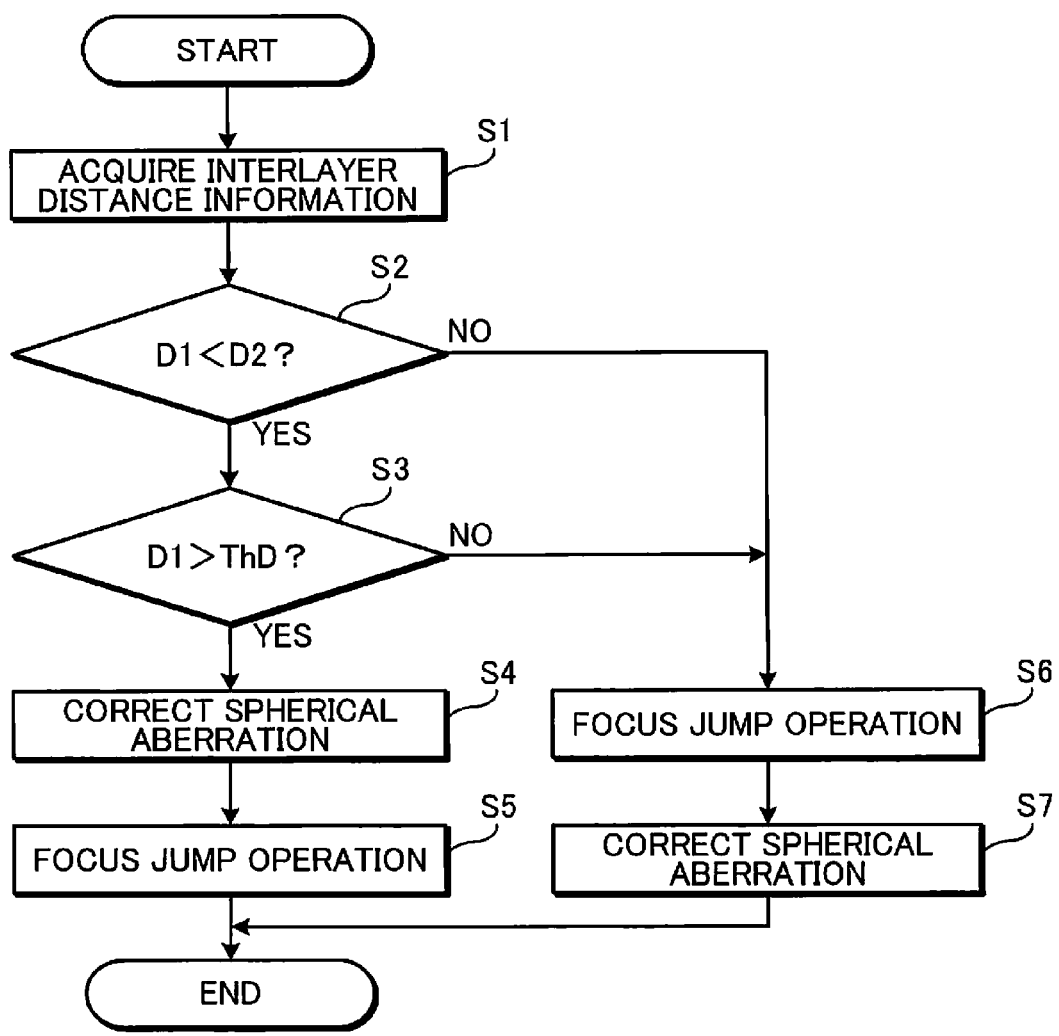
FIG. 2 is a flow chart depicting a procedure of focus jump from the second recording layer to the third recording layer according to Embodiment 1.

FIG. 2 is a flow chart depicting the procedure of focus jump from the second recording layer L1 to the third recording layer L2 according to Embodiment 1.

First in step S1, the interlayer distance information acquisition unit 53 acquires the interlayer distance information of each recording layer of the optical disc 31. The interlayer distance information acquisition unit 53 discerns the type of optical disc 31 when the optical disc 31 is installed, and determines the interlayer distance among recording layers according to the discerned type. The method for acquiring the interlayer distance information by the interlayer distance information acquisition unit 53 will be described later.

Then in step S2, the interlayer shift procedure determination unit 54 determines whether the interlayer distance between the current recording layer and a recording layer, which adjoins in the direction the opposite to the direction of shifting the focal point position of the light beam, is smaller than the interlayer distance between the current recording layer and a recording layer which adjoins in the direction of shifting the focal point position of the optical beam. In the present embodiment, the interlayer shift procedure determination unit 54 determines whether the interlayer distance D1 between the second recording layer L1 and the first recording layer L0 is smaller than the interlayer distance D2 between the second recording layer L1 and the third recording layer L2.

If it is determined that the interlayer distance D1 is smaller than the interlayer distance D2 (YES in step S2), then in step S3, the interlayer shift procedure determination unit 54 determines whether the interlayer distance between the current recording layer and the recording layer which adjoins in the direction the opposite to the direction of shifting the focal point position of the light beam is greater than a predetermined threshold. According to the present embodiment, the interlayer shift procedure determination unit 54 determines whether the interlayer distance D1 is greater than the predetermined threshold ThD.

The threshold ThD indicates the interlayer distance which does not affect the detection of a focus error signal on the current recording layer.

If it is determined that the interlayer distance D1 is greater than the predetermined threshold ThD (YES in step S3), then in step S4, the interlayer shift procedure instruction unit 55 instructs the spherical aberration correction actuator drive circuit 23 to correct the spherical aberration which generates in the light spot on the recording layer (third recording layer L2) at the shift destination. The spherical aberration correction actuator drive circuit 23 drives the spherical aberration correction unit 7 and corrects the spherical aberration which generates in the light spot on the recording layer (third recording layer L2) at the shift destination.

Then in step S5, the interlayer shift procedure instruction unit 55 instructs the control unit 52 to shift the focal point position of the light beam from the current recording layer (second recording layer L1) to another recording layer (third recording layer L2). The control unit 52 outputs a drive signal to the focus actuator drive circuit 21, and the focus actuator drive circuit 21 drives the focus actuator 2 and shifts the focal point position of the light beam from the current recording layer (second recording layer L1) to another recording layer (third recording layer L2).

If it is determined that the interlayer distance D1 is longer than or equal to the interlayer distance D2 (NO in step S2), or if it is determined that the interlayer distance D1 is the predetermined threshold ThD or less (NO in step S3), then in step S6, the interlayer shift procedure instruction unit 55 instructs the control unit 52 to shift the focal point position of the light beam from the current recording layer (second recording layer L1) to another recording layer (third recording layer L2). The control unit 52 outputs a drive signal to the focus actuator drive circuit 21, and the focus actuator drive circuit 21 drives the focus actuator 2 and shifts the focal point position of the light beam from the current recording layer (second recording layer L1) to another recording layer (third recording layer L2).

Then in step S7, the interlayer shift procedure instruction unit 55 instructs the spherical aberration correction actuator drive circuit 23 to correct the spherical aberration which is generated in the light spot on the recording layer (third recording layer L2) at the shift destination. The spherical aberration correction actuator drive circuit 23 drives the spherical aberration correction unit 7 and corrects the spherical aberration which is generated in the light spot on the recording layer (third recording layer L2) at the shift destination.

Figure 3:
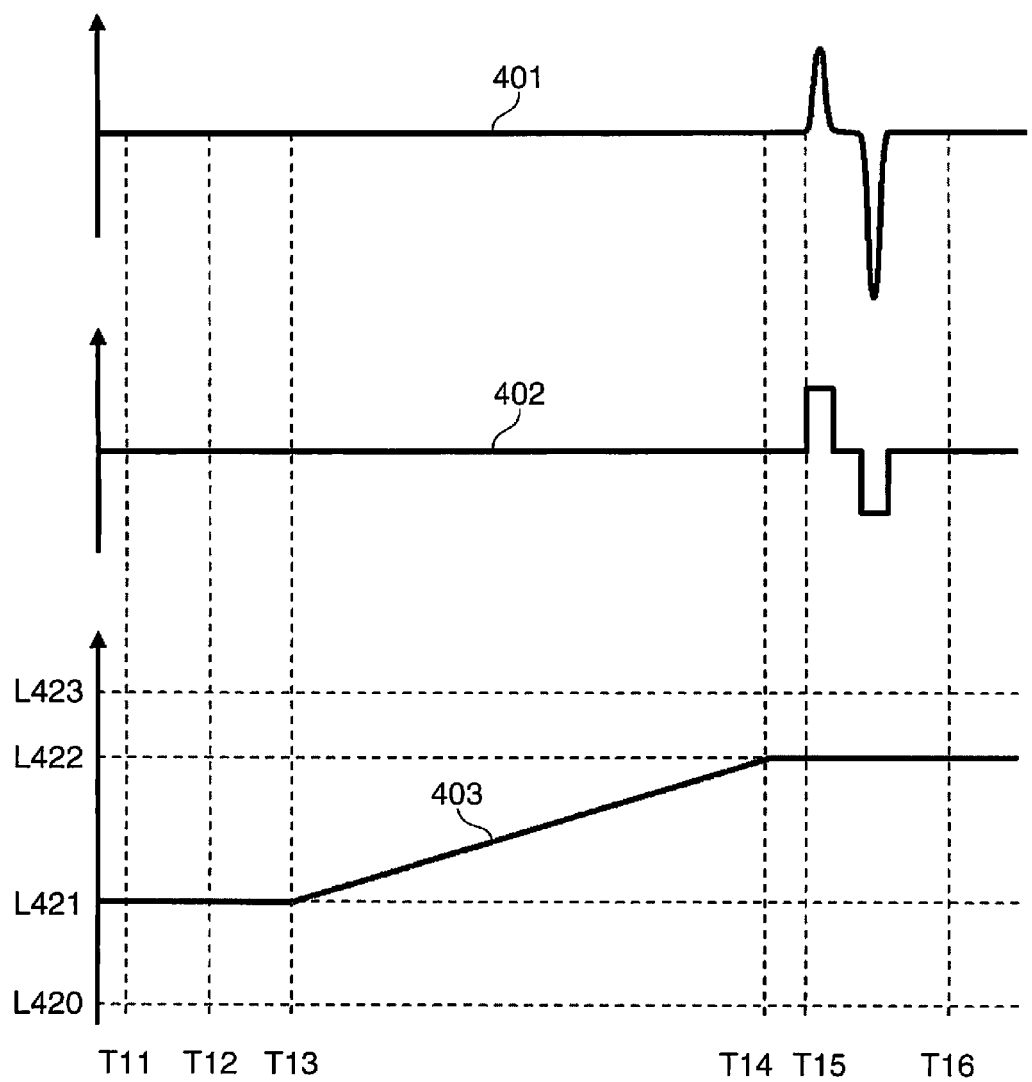
FIG. 3 are graphs showing the change of a focus error signal, focus actuator drive output and a signal to indicate the spherical aberration correction amount upon interlayer shift from the second recording layer to the third recording layer according to Embodiment 1.

FIG. 3 are graphs depicting the change of the focus error signal 401, focus actuator drive output 402 and the signal 403 to indicate the spherical aberration correction amount upon interlayer shifting from the second recording layer L1 to the third recording layer L2 according to Embodiment 1. The state L420 shows a state where the spherical aberration corresponding to the first recording layer L0 is the optimum, the state L421 shows a state where the spherical aberration corresponding to the second recording layer L1 is the optimum, the state L422 shows a state where the spherical aberration corresponding to the third recording layer L2 is the optimum, and the state L423 shows a state where the spherical aberration corresponding to the fourth recording layer L3 is the optimum. The initial state of the signal 403 to indicate the spherical aberration correction amount is the state L421.

Concerning the two recording layers adjacent to the second recording layer L1, the interlayer distance D1 between the first recording layer L0 and the second recording layer L1 is 17 μm, the interlayer distance D2 between the second recording layer L1 and the third recording layer L2 is 20 μm, and the second recording layer L1 is sufficiently away from both of these adjacent recording layers. Therefore as FIG. 12B shows, the focus error signals 301, 302 and 303, acquired in the first recording layer L0, second recording layer L1 and third recording layer L2 respectively are sufficiently separated. In the case of this layer structure, stable focus jump can be implemented by executing the focus jump operation after adjusting the spherical aberration according to the recording layer at the shift destination in advance, as described herein below.

First at the timing T11, the signal 403 to indicate the spherical aberration correction amount is in the state L421 when the recording or reproducing operation is in-progress in the second recording layer L1.

Then at the timing T12, the interlayer shift procedure determination unit 54 determines the switching of the procedure of the focus jump operation and the spherical aberration correction operation based on the interlayer distance D1 between the first recording layer L0 and the second recording layer L1, and the interlayer distance D2 between the second recording layer L1 and the third recording layer L2. Here the interlayer distance among recording layers is acquired by the interlayer distance information acquisition unit 53. The interlayer distance information acquisition unit 53 acquires the interlayer distance based on the standard values of the optical disc 31, which is currently installed, for example.

In concrete terms, if the interlayer distance among recording layers of the optical disc 31 is predetermined by the standard, the interlayer distance information acquisition unit 53 stores the standard values of the interlayer distance in advance, and acquires the interlayer distances by reading the stored standard values.

If it is determined that the interlayer distance D1 is smaller than the interlayer distance D2, and the interlayer distance D1 is greater than the threshold ThD, then the interlayer shift procedure instruction unit 55 instructs the spherical aberration correction actuator drive circuit 23 to correct the spherical aberration at timing T13, according to the spherical aberration correction amount corresponding to the third recording layer L2 at the shift destination. During the timing T13 to T14, the spherical aberration correction actuator drive circuit 23 adjusts the spherical aberration correction amount to the state L422, which is the optimum for the third recording layer L2 while continuing the focus control operation.

In Embodiment 1, the spherical aberration correction unit 7 is comprised of the spherical aberration correction element (e.g. collimator lens) and stepping motor. Therefore the spherical aberration correction amount indicates a position of the spherical aberration correction element where the spherical aberration is the optimum. The interlayer shift procedure instruction unit 55 corresponds and stores each recording layer and the position of the spherical aberration correction element where the spherical aberration is the optimum. The interlayer shift procedure instruction unit 55 reads the position of the spherical aberration correction element where the spherical aberration is the optimum, in the recording layer at the shift destination, and outputs the drive signal to the spherical aberration correction actuator drive circuit 23 so that the spherical aberration correction element shifts to the position which was read.

Then at the timing T15, the interlayer shift procedure instruction unit 55 instructs the focus actuator drive circuit 21, via the control unit 52, to shift the focal point position of the light beam from the second recording layer L1 to the third recording layer L2. During the timing T15 to T16, the focus actuator drive circuit 21 executes the focus jump for shifting the focal point position of the light beam from the second recording layer L1 to the third recording layer L2.

Then at the timing T16, the microcomputer 51 checks whether the focus control is operating accurately, and completes the interlayer shift operation. The focus control is checked based on the reproducing signal quality index which is generated by the reproducing signal quality index generator 28.

If focus control can be stably performed here, it is not always necessary to set the spherical aberration correction amount to the state L422, which is the optimum for the third recording layer L2.

For example, the spherical aberration correction amount may be an intermediate state between the state L421 and state L422. By performing the focus jump operation from the second recording layer L1 to the third recording layer L2, after adjusting the spherical aberration correction amount to the intermediate state between the state L421 which is the optimum for the second recording layer L1 and the state L422 which is the optimum for the third recording layer L2, a stable focus jump operation from the second recording layer L1 to the third recording layer L2 can be implemented.

Figure 4:
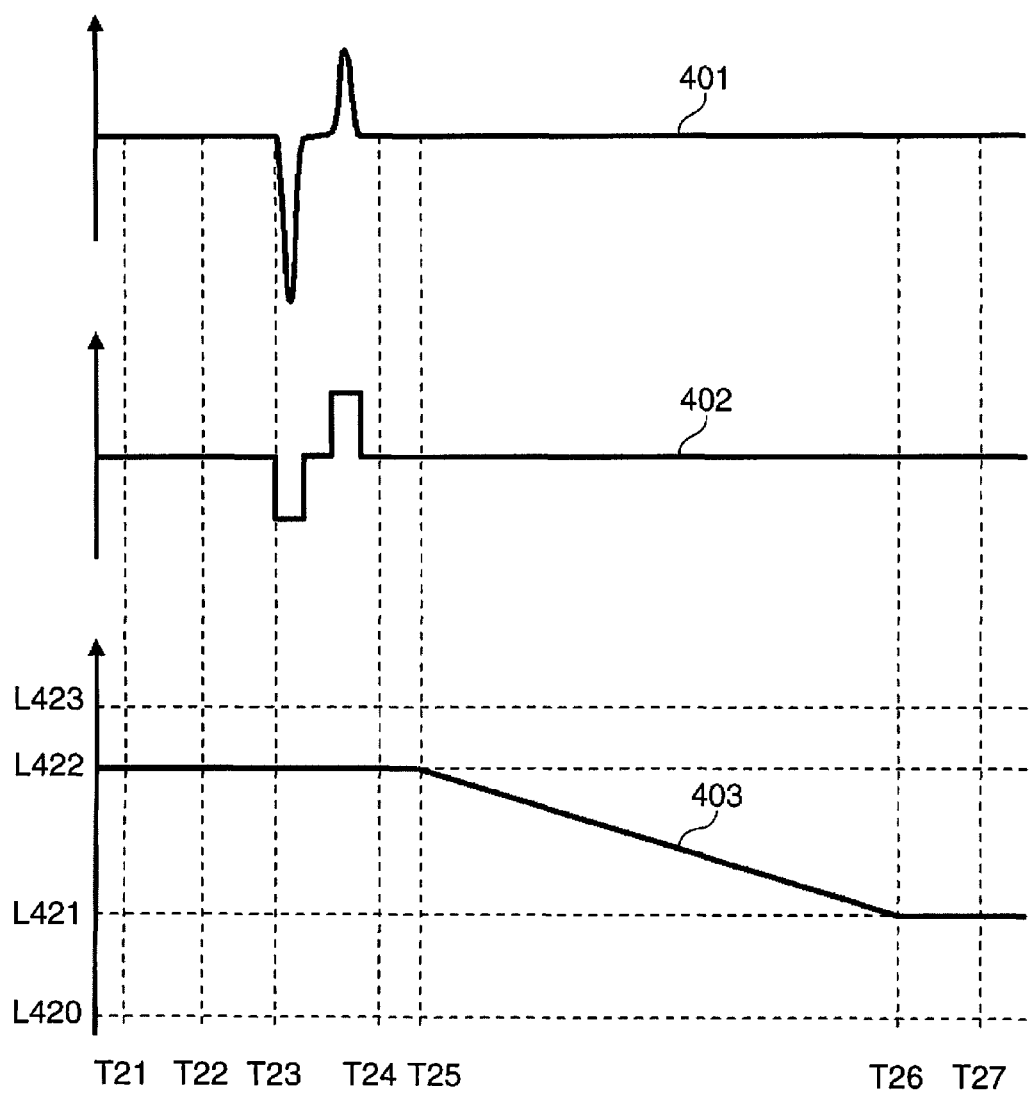
FIG. 4 are graphs showing the change of a focus error signal, focus actuator drive output and a signal to indicate the spherical aberration correction upon interlayer shift from the third recording layer to the second recording layer according to Embodiment 1.

Now the procedure of the focus jump from the third recording layer L2 to the second recording layer L1 will be described with reference to FIG. 4. FIG. 4 are graphs depicting the change of the focus error signal 401, focus actuator drive output 402 and the signal 403 to indicate the spherical aberration correction amount upon interlayer shifting from the third recording layer L2 to the second recording layer L1 according to Embodiment 1. In FIG. 4, description on the same symbols as FIG. 3 are omitted.

The initial state of the signal 403 to indicate the spherical aberration correction amount is the state L422, where the spherical aberration corresponding to the third recording layer L2 is the optimum.

Concerning the two recording layers adjacent to the third recording layer L2, the interlayer distance D2 between the second recording layer L1 and the third recording layer L2 is 20 μm, the interlayer distance D3 between the third recording layer L2 and the fourth recording layer L3 is 13 μm, and the interlayer distance between the third recording layer L2 and one recording layer, out of the two adjacent recording layers, is long, and the interlayer distance between the third recording layer L2 and the other recording layer is short.

As FIG. 12C shows, the focus error signal 302, acquired in the second recording layer L1, and the focus error signal 303 acquired in the third recording layer L2, are sufficiently separated, but the focus error signal 303, acquired in the third recording layer L2 and the focus error signal 304, acquired in the fourth recording layer L3, are not sufficiently separated since the interlayer distance is short. Therefore if the interlayer distance between the third recording layer L2 and the fourth recording layer L3, which is a recording layer at the opposite side of the shift destination, is shorter than a predetermined distance, the focus jump operation is executed first, and then the spherical aberration is adjusted according to the recording layer at the shift destination, whereby a stable focus jump can be implemented.

First at the timing T21, the signal 403 to indicate the spherical aberration correction amount is in the state L422 when the recording or reproducing operation is in-progress in the third recording layer L2.

Then at the timing T22, the interlayer shift procedure determination unit 54 determines the switching of the procedure of the focus jump operation and the spherical aberration correction operation based on the interlayer distance D2 and the interlayer distance D3.

If it is determined that the interlayer distance D3 is smaller than the interlayer distance D2 and the interlayer distance D3 is the threshold ThD or less, the interlayer shift procedure instruction unit 55 instructs the focus actuator drive unit 21, via the control unit 52, to shift the focal point position of the light beam from the third recording layer L2 to the second recording layer L1 at the timing T23. During the timing T23 to T24, the focus actuator drive circuit 21 executes the focus jump for shifting the focal point position of the light beam from the third recording layer L2 to the second recording layer L1.

Then at the timing T24, the microcomputer 51 checks whether the focus control is operating accurately. Next at the timing T25, the interlayer shift procedure instruction unit 55 instructs the spherical aberration correction actuator drive circuit 23 to correct the spherical aberration according to the spherical aberration correction amount corresponding to the second recording layer L1 at the shift destination. During the timing T25 to T26, the spherical aberration correction actuator drive circuit 23 adjusts the spherical aberration correction amount to the state L421, which is the optimum for the second recording layer L1 while continuing the focus control operation. Finally at the timing T27, the microcomputer 51 checks whether the focus control is operating accurately, and completes the interlayer shift operation.

In FIG. 3, if it is determined that the interlayer distance D1 is shorter than the interlayer distance D2 and the interlayer distance D1 is the threshold ThD or less upon executing the focus jump from the second recording layer L1 to the third recording layer L2, operation is substantially the same as that described with reference to FIG. 4. Therefore a stable focus jump can be implemented by performing the procedure described with reference to FIG. 4.

In the same manner, in FIG. 4, if it is determined that the interlayer distance D3 is shorter than the interlayer distance D2 and the interlayer distance D3 is greater than the threshold ThD, upon executing the focus jump from the third recording layer L2 to the second recording layer L1, operation is substantially the same as that described with reference to FIG. 3. Therefore a stable focus jump can be implemented by performing the procedure described with reference to FIG. 3.

If the interlayer distance D1 is the interlayer distance D2 or longer in the description using FIG. 3, or if the interlayer distance D3 is the interlayer distance D2 or longer in the description using FIG. 4, the recording layer in the opposite side of the shift destination does not affect the focus jump operation. Therefore when the interlayer distance D1 is the interlayer distance D2 or longer, or the interlayer distance D3 is the interlayer distance D2 or longer, a stable focus jump operation can be implemented regardless whether the operation procedure is executing focus jump after correcting the spherical aberration, or correcting the spherical aberration after executing the focus jump.

In other words, if it is determined that the interlayer distance D1 is the interlayer distance D2 or longer in step S2 in FIG. 2, processing moves to step S6 where the focus jump operation is executed, but the present invention is not especially limited to this, and if it is determined that the interlayer distance D1 is the interlayer distance D2 or longer, processing may move to step S4 where spherical aberration is corrected.

Further, according to Embodiment 1, the interlayer distance D1 and the interlayer distance D2 are compared, and the interlayer distance D1 and the threshold ThD are compared, but the present invention is not especially limited to this, but the interlayer distance D1 and the threshold ThD may be compared without comparing the interlayer distance D1 and the interlayer distance D2.

In other words, the determination processing in step S2 in FIG. 2 may be omitted. In this case, the interlayer shift procedure determination unit 54 compares the interlayer distance between the current recording layer and a recording layer which adjoins in a direction the opposite to the direction of shifting the focal point position of the light beam and a predetermined threshold, and if the interlayer distance is greater than the threshold, the focal point position is shifted after correcting the spherical aberration, and if the interlayer distance is the threshold or less, the spherical aberration is corrected after shifting the focal point position.

Before correcting the spherical aberration, the control unit 52 may not operate tracking control. Just like the focus error signal, the signal amplitude of the tracking error signal dramatically changes depending on the spherical aberration. Therefore if the spherical aberration is corrected while controlling the tracking, the tracking control becomes unstable. It is preferable that the control unit 52 starts tracking control after the focus jump operation for shifting to another recording layer completes, and it is confirmed that the focus control is being performed accurately.

Or the control unit 52 may change the gain of the tracking control based on the spherical aberration correction amount.

As FIG. 12A to FIG. 12D show, the amplitude of the focus error signal changes depending on the spherical aberration correction amount. Therefore the control unit 52 may correct the focus gain before the focus jump based on the interlayer distance and the spherical aberration correction amount before focus jump. In this case, focus control before the focus jump can be further stabilized.

The control unit 52 may also correct the focus gain after the focus jump based on the interlayer distance and the spherical aberration correction amount before the focus jump. In this case, focus control after the focus jump can be further stabilized.

Further, the control unit 52 may correct a focus gain before and after the focus jump. In this case, a gain switching operation before and after the focus jump becomes unnecessary.

The interlayer distance information of each recording layer used here is determined according to the distance from the optical disc surface to each recording layer, which is determined by the standards of the optical disc. However the interlayer distance information acquisition unit 53 may drive the focus actuator 2 at a predetermined speed in a vertical direction (optical axis direction) to the optical disc 31, and acquire the interlayer distance information of each recording layer based on the detection timing of the focus error signal, which is acquired when the light beam enters the information recording surface of the optical disc 31.

In other words, the interlayer distance information acquisition unit 53 detects the focus error signal which is generated by the focus error signal generator 25, while driving the objective lens 1 at a predetermined speed in the optical axis direction using the focus actuator drive circuit 21, and acquires the interlayer distance information based on the detection timing of the focus error signal.

The optical device may further have a disc discernment unit which discerns the type of optical disc, so that the interlayer distance information acquisition unit 53 acquires the interlayer distance information based on the standard value corresponding to the type of the optical disc discerned by the disc discernment unit. In this case, the interlayer distance information acquisition unit 53 corresponds and stores a type of optical disc and the interlayer distance information in advance, and acquires the interlayer distance information by reading interlayer distance information corresponding to the type of the optical disc discerned by the disc discernment unit.

The interlayer distance information acquisition unit 53 may acquire the interlayer distance information based on the spherical aberration correction amount in a position where the amplitude of the tracking error signal generated in each recording layer of the optical disc is the highest.

The interlayer distance information acquisition unit 53 may also acquire the interlayer distance information based on the spherical aberration correction amount with which the reproducing signal quality index, generated by reproducing a recorded area of each recording layer of the optical disc, becomes best.

The method for acquiring the interlayer distance information is not limited to the above mentioned methods, but can be any means with which information corresponding to the interlayer distance among recording layers can be acquired. The interlayer distance among recording layers could possibly disperse due to manufacturing dispersion or the like of the multilayer optical disc. However if an optimum spherical aberration correction amount in each recording layer is determined in advance, a more stable focus jump operation is possible.

The control unit 52 may correct the focus gain according to the change amount of the spherical aberration correction amount upon executing the focus jump operation. If spherical aberration is generated, the amplitude of the focus error signal decreases and the focus gain drops. However by appropriately changing the focus gain according to the change amount of the spherical aberration correction amount, a stable focus jump operation can be implemented regardless the interlayer distance of the recording layer.

By executing the focus jump operation and spherical aberration correction operation according to this procedure, a stable interlayer shift can be implemented, and a stable and high-speed interlayer access can be implemented even in the multilayer optical disc having three or more recording layers.

Embodiment 2

An optical disc apparatus according to Embodiment 2 of the present invention will now be described.

In Embodiment 2, the spherical aberration correction amount upon execution of focus jump can be changed according to the respective interlayer distance of the two recording layers adjacent to the current recording layer in which focus control is performed.

Figure 5:
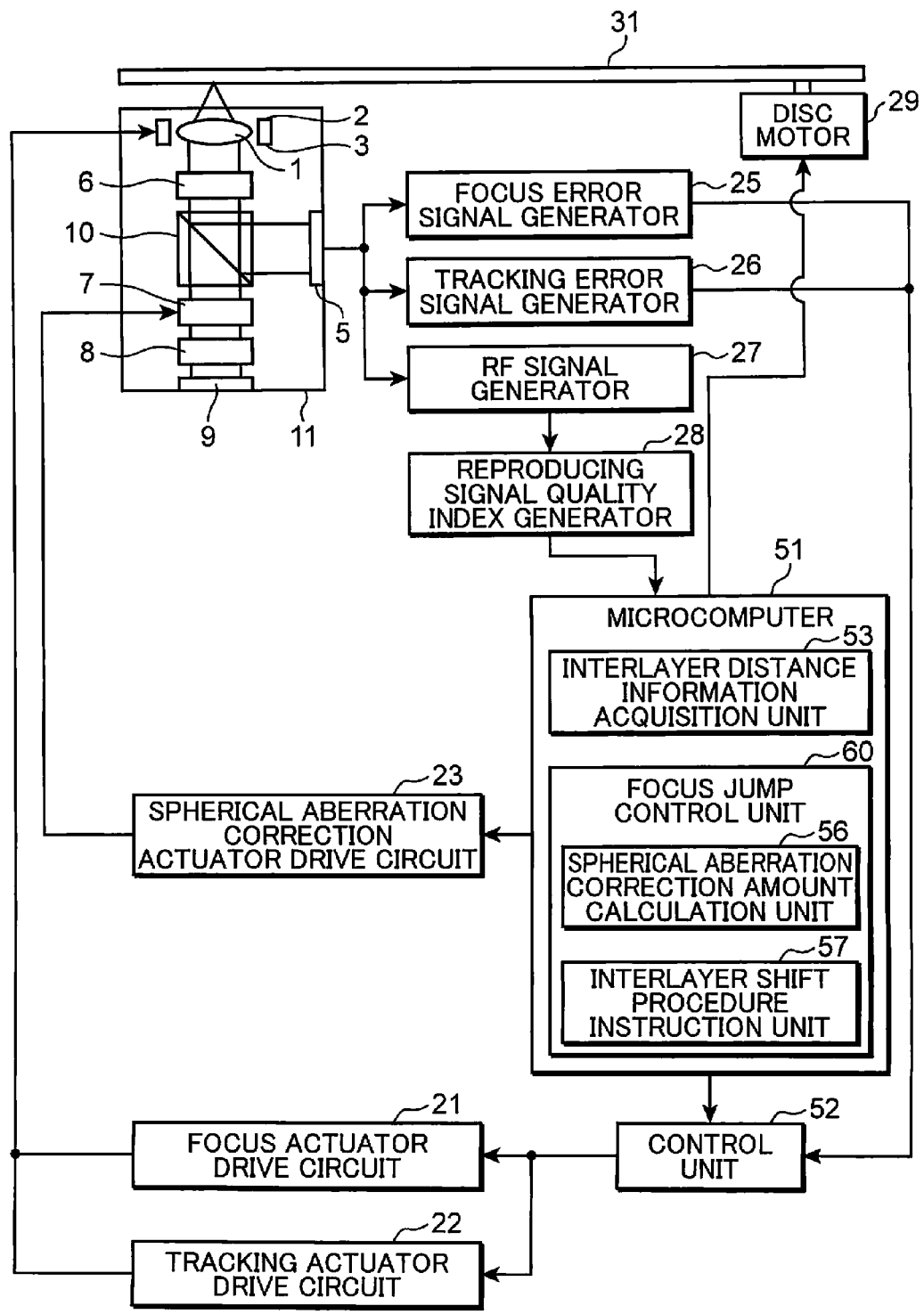
FIG. 5 is a block diagram depicting a configuration of an optical disc apparatus according to Embodiment 2 of the present invention.

FIG. 5 is a block diagram depicting an optical disc apparatus according to Embodiment 2 of the present invention.

The optical disc apparatus in FIG. 5 has an optical pickup 11, focus actuator drive circuit 21, tracking actuator drive circuit 22, spherical aberration correction actuator drive circuit 23, focus error signal generator 25, tracking error signal generator 26, RF signal generator 27, reproducing signal quality index generator 28, disc motor 29, microcomputer 51 and control unit 52. The optical pickup 11 has an objective lens 1, focus actuator 2, tracking actuator 3, light receiving unit 5, ¼ wavelength plate 6, spherical aberration correction unit 7, collimator lens 8, laser light source 9 and polarization beam splitter 10.

In the optical disc apparatus shown in FIG. 5, a same composing element as that of the optical disc apparatus shown in FIG. 1 is denoted with a same reference numeral, for which description is omitted.

The microcomputer 51 has an interlayer distance information acquisition unit 53 and a focus jump control unit 60. The focus jump control unit 60 has a spherical aberration correction amount calculation unit 56 and an interlayer shift procedure instruction unit 57.

The spherical aberration correction amount calculation unit 56 calculates the spherical aberration correction amount for correcting the spherical aberration based on an interlayer distance between a current recording layer on which the light beam is focusing, and a recording layer which adjoins a direction of shifting the focal point position of the light beam, and an interlayer distance between the current recording layer and a recording layer which adjoins the direction the opposite to the direction of shifting the focal point position of the light beam.

The interlayer shift procedure instruction unit 57 instructs the spherical aberration correction actuator drive circuit 23 to correct the spherical aberration according to the spherical aberration correction amount calculated by the spherical aberration correction amount calculation unit 56, instructs the control unit 52 to shift the focal point position of the light beam from the current recording layer to another recording layer, and instructs the spherical aberration correction actuator drive circuit 23 to correct the spherical aberration on another recording layer after the shift.

The spherical aberration correction actuator drive circuit 23 drives the spherical aberration correction unit 7 to correct the spherical aberration according to the spherical aberration correction amount which is calculated by the spherical aberration correction amount calculation unit 56.

In Embodiment 2, the spherical aberration correction amount calculation unit 56 corresponds to an example of the spherical aberration correction amount calculation unit, and the interlayer shift procedure instruction unit 57 corresponds to an example of the instruction unit.

Now the procedure of focus jump from the second recording layer L1 to the third recording layer L2 according to Embodiment 2 will be described with reference to FIG. 6.

Figure 6:
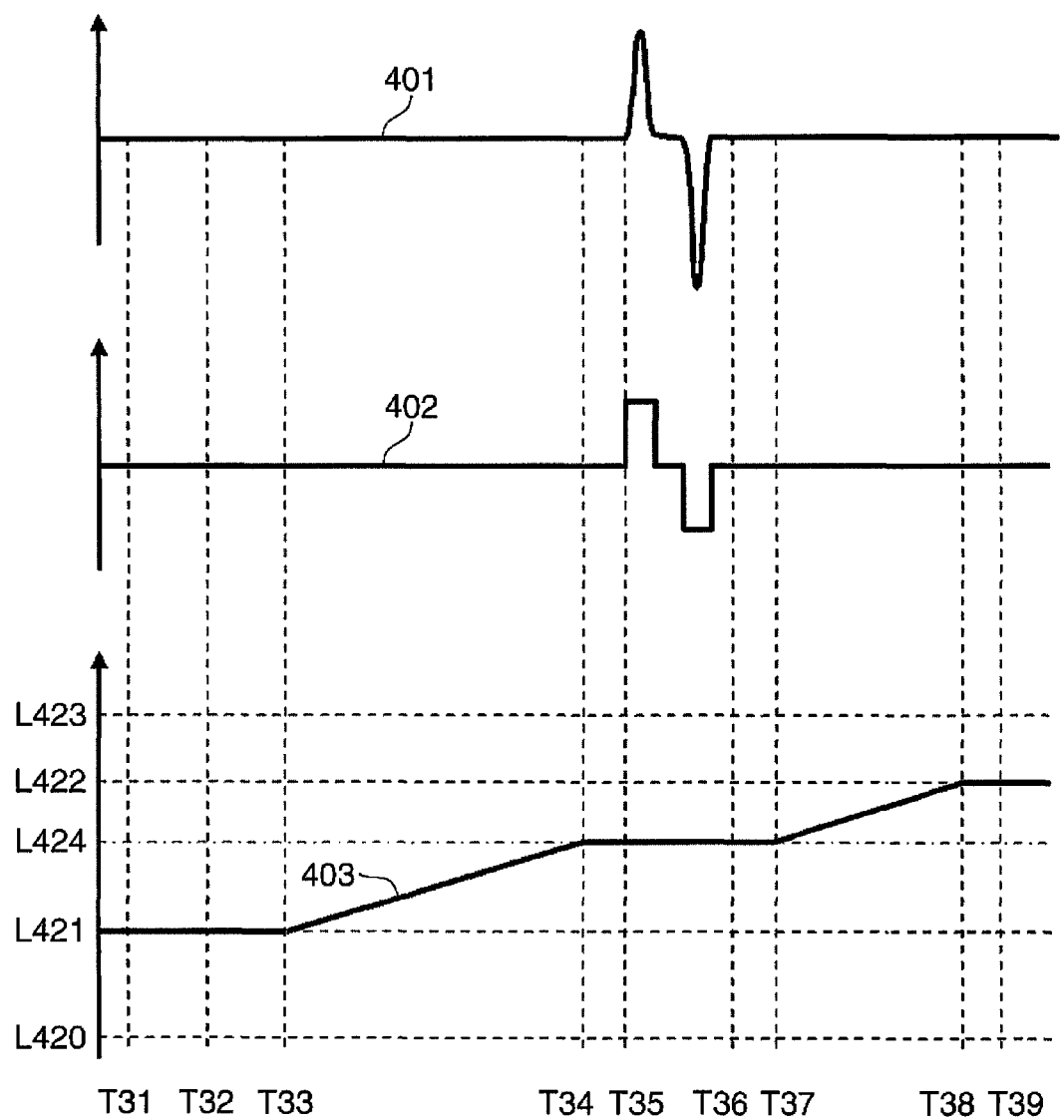
FIG. 6 are graphs showing the change of a focus error signal, focus actuator drive output and a signal to indicate the spherical aberration correction amount upon interlayer shift from the second recording layer to the third recording layer according to Embodiment 2.

FIG. 6 are graphs depicting the change of the focus error signal 401, focus actuator drive output 402 and the signal 403 to indicate the spherical aberration correction amount upon interlayer shifting from the second recording layer L1 to the third recording layer L2 according to Embodiment 2.

First at the timing T31, the signal 403 to indicate the spherical aberration correction amount is in the state L421 when the recording or reproducing operation is in-progress in the second recording layer L1.

Then at the timing T32, the spherical aberration correction amount calculation unit 56 calculates the spherical aberration correction amount upon executing focus jump, based on the interlayer distance between the second recording layer L1 and the first recording layer L0, and the interlayer distance between the second recording layer L1 and the third recording layer L2, which were acquired by the interlayer distance information acquisition unit 53. The spherical aberration correction amount calculation unit 56 calculates the spherical aberration correction position to indicate the position where the spherical aberration is corrected, and calculates the spherical aberration correction amount for correcting the spherical aberration so that the spherical aberration becomes the smallest in the calculated spherical aberration correction position. The spherical aberration correction position calculated by the spherical aberration correction amount calculation unit 56 indicates what the distance in μm is of the position, in which the spherical aberration correction amount is adjusted, from the surface of the optical disc 31 upon executing focus jump.

The spherical aberration correction amount calculation unit 56 calculates the spherical aberration correction position SAtgt2 upon executing focus jump using the following Expression (1), where SAtgt is an interlayer distance from the surface to the third recording layer L2, ΔSA1 is an interlayer distance from the second recording layer L1 to the third recording layer L2, ΔSA2 is an interlayer distance from the second recording layer L1 to the first recording layer L0, and K is a correction coefficient of an interlayer distance.

$$SAtgt2 = SAtgt + (\Delta SA1/\Delta SA2) \times K \quad (1)$$

For example, if the interlayer distance SAtgt is 63 μm, the interlayer distance ΔSA1 is 20 μm, the interlayer distance ΔSA2 is 17 μm, and the correction coefficient K is 10, the spherical aberration correction position SAtgt2 is calculated by the following Expression (2).

$$SAtgt2 = 63 + (20/17) \times 10 = 74.8 \quad (2)$$

This means that upon executing focus jump to the third recording layer L2 in a position which is 63 μm from the surface, the focus jump is executed in an adjusted state so that the spherical aberration amount becomes the optimum in the spherical aberration correction position which is 74.8 μm from the surface. The state L424 shows a state where the spherical aberration correction amount is adjusted to the optimum in the spherical aberration correction position which is 74.8 μm from the surface.

Then at the timing T33, the interlayer shift procedure instruction unit 57 instructs the spherical aberration correction actuator drive circuit 23 to correct the spherical aberration according to the spherical aberration correction amount calculated by the spherical aberration correction amount calculation unit 56. During the timing T33 to T34, the spherical aberration correction actuator drive circuit 23 adjusts the spherical aberration correction amount to the state L424 while continuing the focus control operation.

In Embodiment 2, the spherical aberration correction unit 7 is comprised of the spherical aberration correction element (e.g. collimator lens) and the stepping motor. Therefore the spherical aberration correction amount indicates a position of the spherical aberration correction element where the spherical aberration is the optimum. The spherical aberration correction amount calculation unit 56 corresponds the distance from the surface of the optical disc and the position of the spherical aberration correction element where the spherical aberration is the optimum and stores these in advance. The spherical aberration correction amount calculation unit 56 reads the distance from the surface of the optical disc, that is a position of the spherical aberration correction element where the spherical aberration is the optimum in the calculated spherical aberration correction position, and outputs a drive signal to the spherical aberration correction actuator drive circuit 23 so that the spherical aberration correction element shifts to this position which is read.

Then at the timing T35, the interlayer shift procedure instruction unit 57 instructs the focus actuator drive circuit 21, via the control unit 52, to shift the focal point position of the light beam from the second recording layer L1 to the third recording layer L2. During the timing T35 to T36, the focus actuator drive circuit 21 executes focus jump for shifting the focal point position of the light beam from the second recording layer L1 to the third recording layer L2.

Then at the timing T36, the microcomputer 51 checks whether the focus control is operating accurately. Then at the timing T37, the interlayer shift procedure instruction unit 57 instructs the spherical aberration correction actuator drive circuit 23 to correct the spherical aberration in the third recording layer L2 after the shift. During the timing T37 to T38, the spherical aberration correction actuator drive circuit 23 adjusts the spherical aberration correction amount from the state L424 to the state L422 again, while continuing the focus control operation. Finally at the timing T39, the microcomputer 51 checks whether the focus control is operating accurately, and completes the interlayer shift operation.

Now the procedure of the focus jump from the third recording layer L2 to the second recording layer L1 according to Embodiment 2 will be described with reference to FIG. 7.

Figure 7:
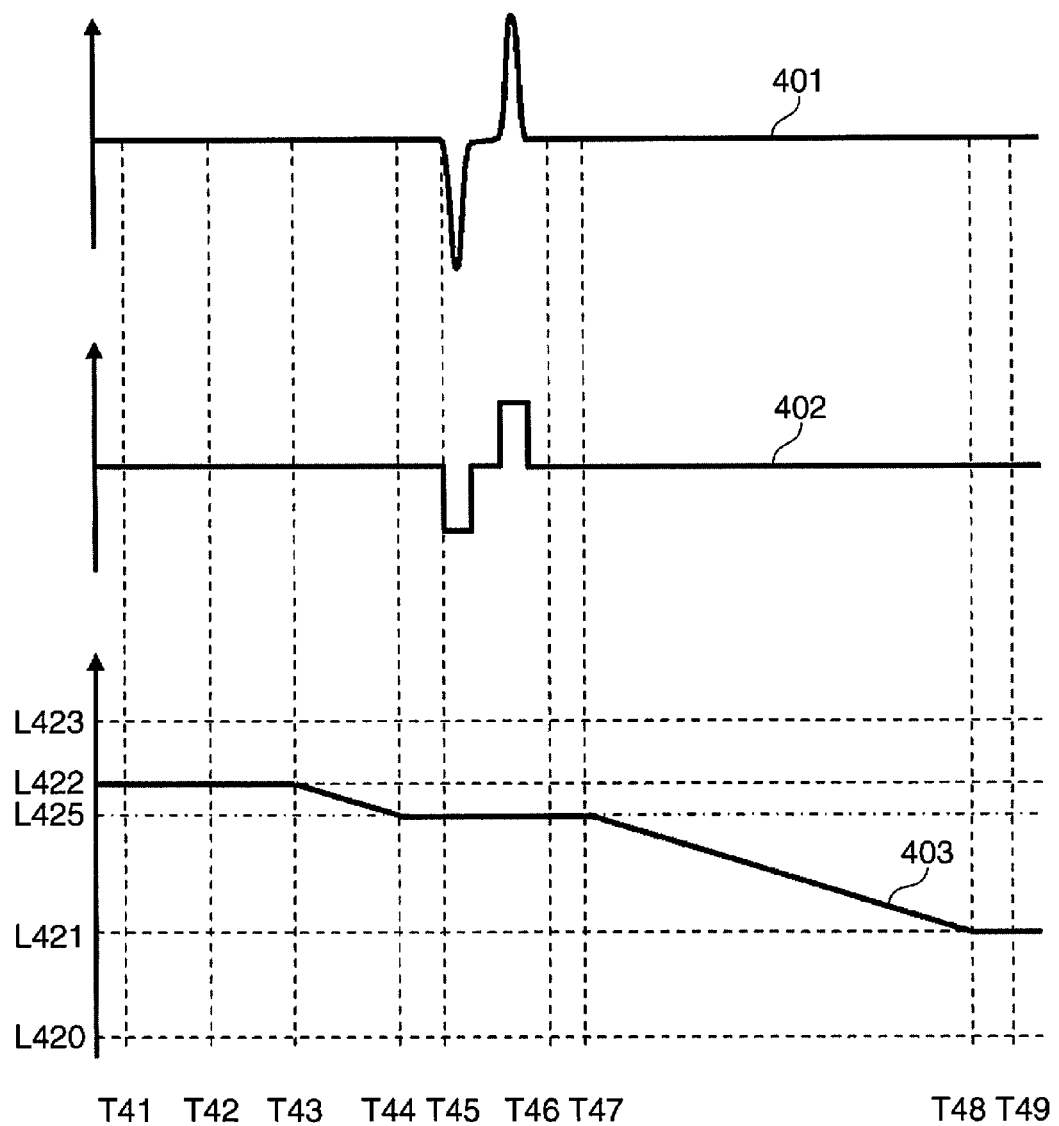
FIG. 7 are graphs showing the change of a focus error signal, focus actuator drive output and a signal to indicate the spherical aberration correction upon interlayer shift from the third recording layer to the second recording layer according to Embodiment 2.

FIG. 7 are graphs depicting the change of the focus error signal 401, focus actuator drive output 402 and the signal 403 to indicate the spherical aberration correction amount upon interlayer shifting from the third recording layer L2 to the second recording layer L1 according to Embodiment 2.

First at the timing T41, the signal 403 to indicate the spherical aberration correction amount is in the state L422 when the recording or recording operation is in-progress in the third recording layer L2.

Then at the timing T42, the spherical aberration correction amount calculation unit 56 calculates the spherical aberration correction amount upon executing the focus jump, based on the interlayer distance between the third recording layer L2 and the second recording layer L1, and the interlayer distance between the third recording layer L2 and the fourth recording layer L3 which were acquired by the interlayer distance information acquisition unit 53. The spherical aberration correction amount calculation unit 56 calculates the spherical aberration correction position for correcting the spherical aberration, and calculates the spherical aberration correction amount for correcting the spherical aberration so that the spherical aberration becomes smallest in the calculated spherical aberration correction position.

The spherical aberration correction amount calculation unit 56 calculates the spherical aberration correction position SAtgt2 upon executing focus jump using the following Expression (3), where SAtgt is an interlayer distance from the surface to the second recording layer L1, ΔSA1 is an interlayer distance from the third recording layer L2 to the second recording layer L1, ΔSA2 is an interlayer distance from the third recording layer L2 to the fourth recording layer L3, and K is a correction coefficient of an interlayer distance.

$$SAtgt2 = SAtgt - (\Delta SA1/\Delta SA2) \times K \quad (3)$$

For example, if the interlayer distance SAtgt is 83 μm, the interlayer distance ΔSA1 is 20 μm, the interlayer distance ΔSA2 is 13 μm and the correction coefficient K is 10, the spherical aberration correction position SAtgt2 is calculated by the following Expression (4).

$$SAtgt2 = 83 - (20/13) \times 10 = 67.6 \quad (4)$$

This means that upon executing focus jump to the second recording layer L1 in a position which is 83 μm from the surface, the focus jump is executed in an adjusted state so that the spherical aberration amount becomes the optimum in the spherical aberration correction position which is 67.6 μm from the surface. The state L425 shows a state where the spherical aberration correction amount is adjusted to the optimum in the spherical aberration correction position which is 67.6 μm from the surface.

Then at the timing T43, the interlayer shift procedure instruction unit 57 instructs the spherical aberration correction actuator drive circuit 23 to correct the spherical aberration according to the spherical aberration correction amount calculated by the spherical aberration correction amount calculation unit 56. During the timing T43 to T44, the spherical aberration correction actuator drive circuit 23 adjusts the spherical aberration correction amount to the state L425, while continuing the focus control operation.

Then at the timing T45, the interlayer shift procedure instruction unit 57 instructs the focus actuator drive circuit 21, via the control unit 52, to shift the focal point position of the light beam from the third recording layer L2 to the second recording layer L1. During the timing T45 to T46, the focus actuator drive circuit 21 executes focus jump for shifting the focal point position of the light beam from the third recording layer L2 to the second recording layer L1.

Then at the timing T46, the microcomputer 51 checks whether the focus control is operating accurately. Then at the timing T47, the interlayer shift procedure instruction unit 57 instructs the spherical aberration correction actuator drive circuit 23 to correct the spherical aberration in the second recording layer L1 after the shift. During the timing T47 to T48, the spherical aberration correction actuator drive circuit 23 adjusts the spherical aberration correction amount from the state L425 to the state L421 again, while continuing the focus control operation. Finally at the timing T49, the microcomputer 51 checks whether the focus control is operating accurately, and completes the interlayer shift operation.

If the interlayer distance between the current recording layer and the recording layer adjacent to the current recording layer is sufficiently long, the focus error signals acquired in each recording layer can be sufficiently separated. Therefore if the interlayer distance between the current recording layer and the recording layer adjacent to the current recording layer exceeds a predetermined threshold, the influence from the adjacent recording layer on the focus error signal may be ignored. The adjacent recording layer mentioned here includes the surface of the optical disc.

For example, the focus jump from the fourth recording layer L3 to the third recording layer L2 will be described. The spherical aberration correction amount calculation unit 56 calculates the spherical aberration correction position SAtgt2 upon executing focus jump using the following Expression (5), where SAtgt is an interlayer distance from the surface to the third recording layer L2, ΔSA1 is an interlayer distance from the fourth recording layer L3 to the third recording layer L2, ΔSA2 is an interlayer distance from the fourth recording layer L3 to the surface, and K is a correction coefficient of an interlayer distance.

$$SAtgt2 = SAtgt - (\Delta SA1/\Delta SA2) \times K \quad (5)$$

If the threshold of the interlayer distance to ignore the influence from another recording layer is 30 μm, for example, the interlayer distance ΔSA2 from the fourth recording layer L3 to the surface exceeds this threshold. "The interlayer distance ΔSA2 is sufficiently long, that the influence from adjacent recording layers on the focus error signal can be ignored" is equivalent to "ΔSA2 can be handled as infinity".

Therefore if the interlayer distance SAtgt is 63 μm, the interlayer distance ΔSA1 is 10 μm, the interlayer distance ΔSA2 is 50 μm, the correction coefficient K is 10, and threshold is 30 μm, for example, then the spherical aberration correction position SAtgt2 is calculated by the following Expression (6).

$$SAtgt2=63-(10/\infty)\times10=63-0=63 \quad (6)$$

This means that upon shifting the focal point position from the fourth recording layer L3 to the third recording layer L2, the focus jump is executed in an adjusted state so that the spherical aberration amount becomes the optimum in the spherical aberration correction position which is 63 μm from the surface, that is, on the third recording layer L2.

The method for determining the spherical aberration correction amount is not limited to the determination method shown in Embodiment 2, but may be changed according to the characteristics of the optical pickup. This spherical aberration correction amount calculation unit 56 may determine the spherical aberration correction amount by preparing a table showing the spherical aberration correction amount corresponding to the interlayer distance among recording layers in advance, and referring to this table. Critical here is that the spherical aberration correction amount calculation unit 56 can determine the spherical aberration correction amount appropriately according to the interlayer distance among recording layers of the multilayer optical disc.

Thus far the shift to a recording layer adjacent to the current recording layer in the multilayer optical disc was described, but Embodiment 1 and Embodiment 2 can also be applied to an interlayer shift from the current recording layer to the recording layers at a plurality of destinations. By continuously performing an interlayer shift to an adjacent recording layer, a stable interlayer shift to another recording layer, which is a plurality of layers away from the current recording layer, is implemented. In other words, upon shifting the focal point position from the current recording layer, on which the light beam is focused, to another recording layer which is m layers (m is 2 or greater integer) away, the focus jump control unit 60 controls the correction of spherical aberration by the spherical aberration correction actuator drive circuit 23 and the shift of the focal point position by the focus actuator drive circuit 21, so that the operation of shifting the focal point position to an adjacent recording layer is repeated m number of times.

Embodiment 3

An optical disc apparatus according to Embodiment 3 of the present invention will now be described.

In Embodiment 1 and Embodiment 2, the spherical aberration correction operation and focus jump operation are independently operated, but in Embodiment 3, the focus jump operation is executed while continuing the spherical aberration correction operation without interrupting the spherical aberration correction operation.

Figure 8:
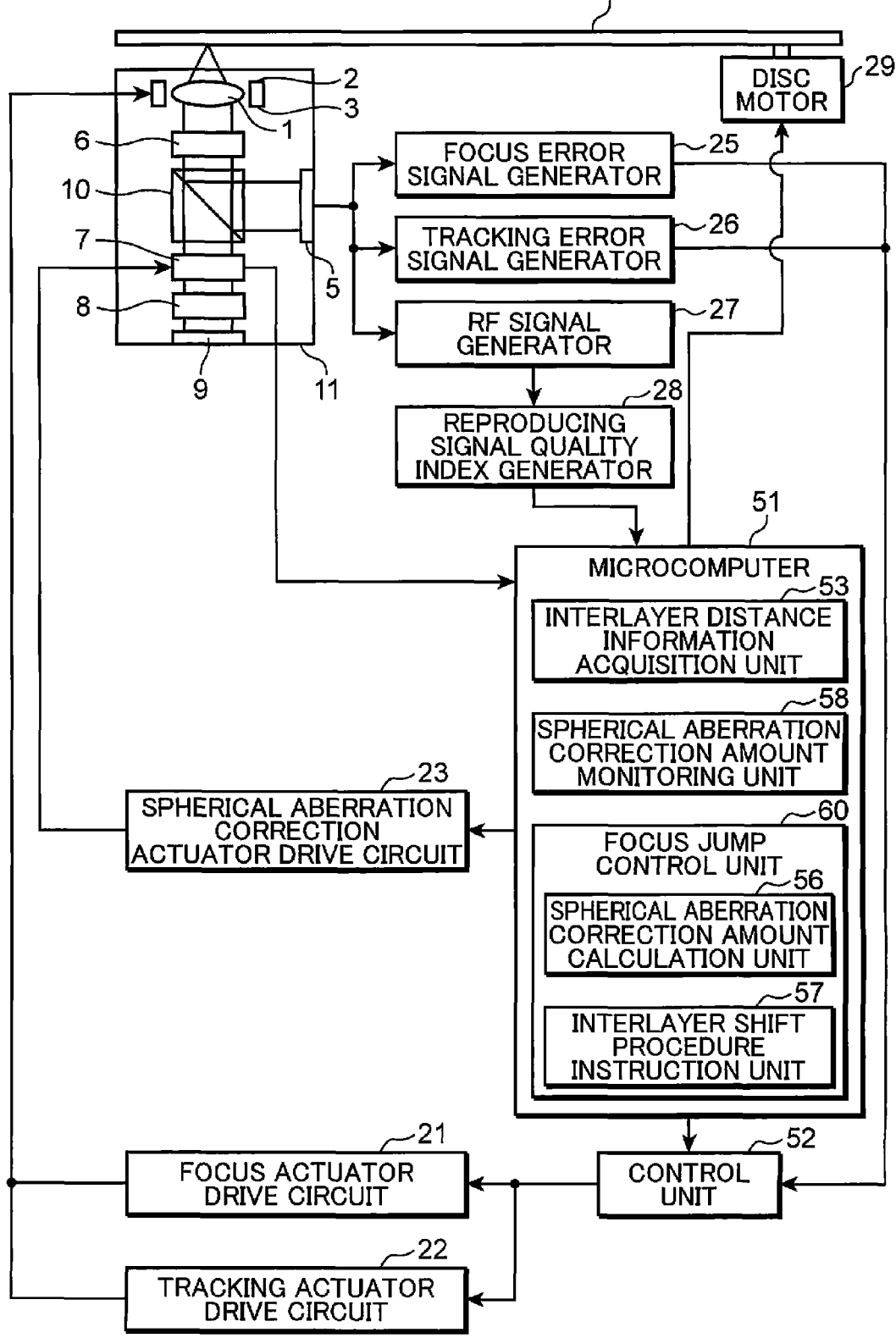
FIG. 8 is a block diagram depicting a configuration of an optical disc apparatus according to Embodiment 3 of the present invention.

FIG. 8 is a block diagram depicting an optical disc apparatus according to Embodiment 3 of the present invention.

The optical disc apparatus in FIG. 8 has an optical pickup 11, focus actuator drive circuit 21, tracking actuator drive circuit 22, spherical aberration correction actuator drive circuit 23, focus error signal generator 25, tracking error signal generator 26, RF signal generator 27, reproducing signal quality index generator 28, disc motor 29, microcomputer 51 and control unit 52. The optical pickup 11 has an objective lens 1, focus actuator 2, racking actuator 3, light receiving unit 5, ¼ wavelength plate 6, spherical aberration correction unit 7, collimator lens 8, laser light source 9 and polarization beam splitter 10.

In the optical disc apparatus shown in FIG. 8, a same composing element as that of the optical disc apparatuses shown in FIG. 1 and FIG. 5 is denoted with a same reference numeral, for which description is omitted.

The microcomputer 51 has an interlayer distance information acquisition unit 53, spherical aberration correction amount monitoring unit 58 and focus jump control unit 60. The focus jump control unit 60 has a spherical aberration correction amount calculation unit 56 and interlayer shift procedure instruction unit 57.

The spherical aberration correction amount monitoring unit 58 monitors the spherical aberration correction amount by the spherical aberration correction unit 7. The spherical aberration correction unit 7 shifts the spherical aberration correction element (e.g. collimator lens) by the stepping motor. In this case, the spherical aberration correction amount can be acquired by detecting a position of the spherical aberration correction element on the optical path where the light beam in the optical pickup passes through, that is, the position of the spherical aberration correction element after being driven by the stepping motor. In other words, the spherical aberration correction amount monitoring unit 58 can constantly monitor the spherical aberration correction amount while performing the spherical aberration correction operation by the stepping motor. Therefore the spherical aberration correction amount monitoring unit 58 monitors the position of the spherical aberration correction element of the spherical aberration correction unit 7. In Embodiment 3 as well, the spherical aberration correction amount shows the position of the spherical aberration correction element where the spherical aberration is the optimum.

The spherical aberration correction amount calculation unit 56 calculates the spherical aberration correction amount for correcting the spherical aberration based on an interlayer distance between a current recording layer on which the light beam is focusing, and a recording layer which adjoins in the direction the opposite to the direction shifting the focal point position of the light beam. In the case of shifting the focal point position to another recording layer which is two or more layers away from the current layer, the spherical aberration correction amount calculation unit 56 calculates each spherical aberration correction amount in the case of shifting the focal point position to the adjacent recording layer.

In the case of shifting the focal point position to another recording layer which is two or more layers away from the current layer, the spherical aberration correction amount calculation unit 56 calculates each spherical aberration correction amount upon shifting the focal point position to the adjacent recording layer based on the interlayer distance between the current recording layer on which the light beam is focusing, and a recording layer which adjoins in a direction of shifting the focal point position of the light beam, and the interlayer distance between the current recording layer and the recording layer which adjoins in the direction the opposite to the direction of shifting the focal point position of the light beam.

The interlayer shift procedure instruction unit 57 instructs the focus actuator drive circuit 21 to shift the focal point position to the adjacent recording layer in the case of the spherical aberration correction amount of the spherical aberration correction unit 7, monitored by the spherical aberration correction amount monitoring unit 58, reaches the spherical aberration correction amount calculated by the spherical aberration correction amount calculation unit 56 until the time when the spherical aberration becomes the optimum in the other recording layer after correction of the spherical aberration is started so that the spherical aberration becomes the optimum in the other recording layer at the shift destination.

In Embodiment 2, the spherical aberration correction amount calculation unit 56 corresponds to an example of the spherical aberration correction amount calculation unit, the interlayer shift procedure instruction unit 57 corresponds to an example of the instruction unit, and the spherical aberration correction amount monitoring unit 58 corresponds to an example of the monitoring unit.

Now the procedure of focus jump from the third recording layer L2 to the second recording layer L1 according to Embodiment 3 will be described with reference to FIG. 9.

Figure 9:
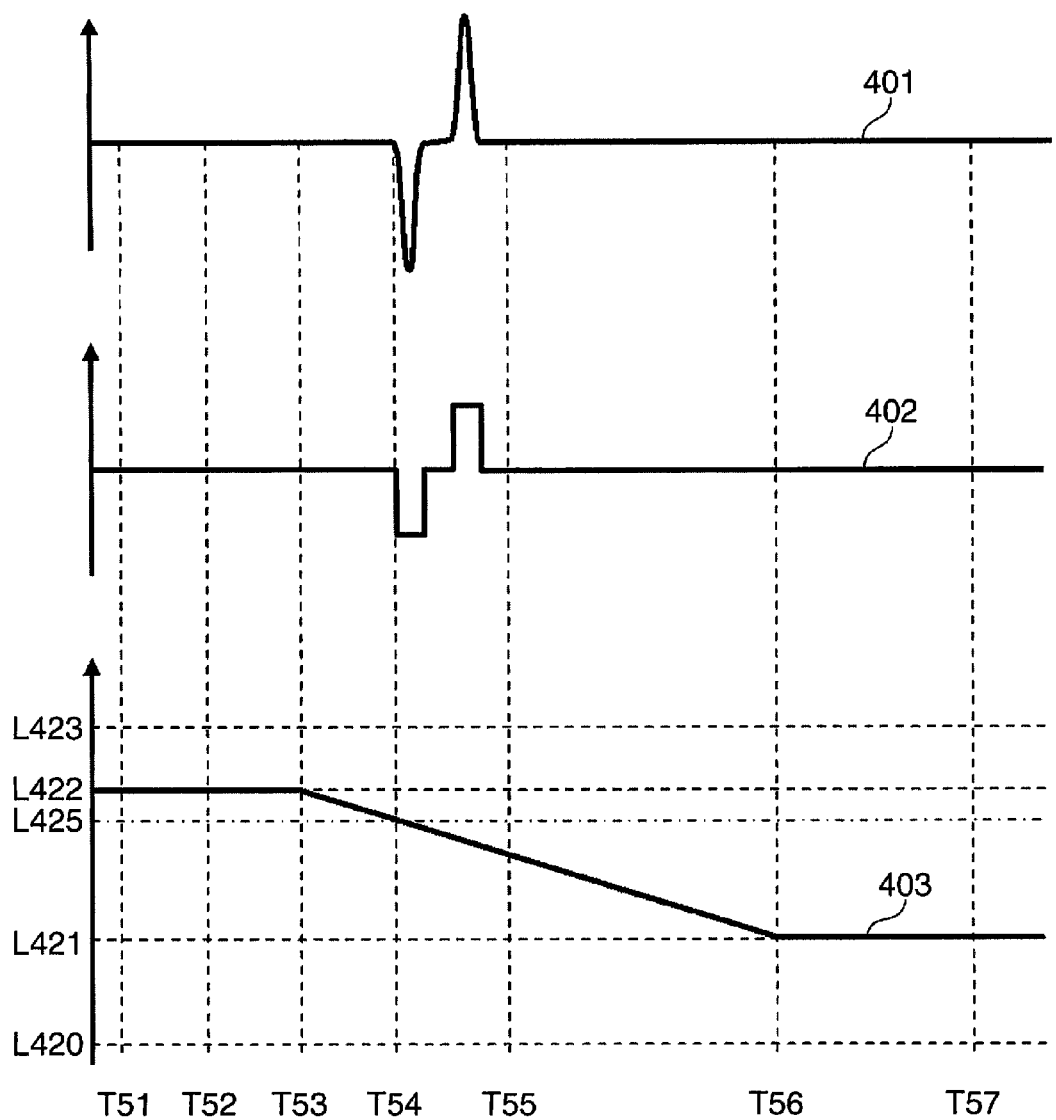
FIG. 9 are graphs showing the change of a focus error signal, focus actuator drive output and a signal to indicate the spherical aberration correction amount upon interlayer shift from the third recording layer to the second recording layer according to Embodiment 3.

FIG. 9 are graphs depicting the change of the focus error signal 401, focus actuator drive output 402 and the signal 403 to indicate the spherical aberration correction amount upon interlayer shifting from the third recording layer L2 to the second recording layer L1.

First at the timing T51, the signal 403 to indicate the spherical aberration correction amount is in the state L422 when the recording or reproducing operation is in-progress in the third recording layer L2.

Then at the timing T52, the spherical aberration correction amount calculation unit 56 calculates the spherical aberration correction amount upon executing focus jump, based on the interlayer distance between the third recording layer L2 and the second recording layer L1, and the interlayer distance between the third recording layer L2 and the fourth recording layer L3, which were acquired by the interlayer distance information acquisition unit 53. The spherical aberration correction amount calculation unit 56 calculates the spherical aberration correction position for correcting the spherical aberration, and calculates the spherical aberration correction amount for correcting the spherical aberration so that the spherical aberration becomes the smallest in the calculated spherical aberration correction position.

Here upon executing focus jump to the second recording layer L1 in a position which is 85 μm from the surface, the focus jump is executed in an adjusted state so that the spherical aberration amount becomes the optimum in the spherical aberration correction position which is 69 μm from the surface. The expression to calculate the spherical aberration correction position in Embodiment 3, which is the same as that described in Embodiment 2, is omitted.

At the timing T53, the interlayer shift procedure instruction unit 57 instructs the spherical aberration correction actuator drive circuit 23 to correct the spherical aberration according to the spherical aberration correction amount corresponding to the second recording layer L1 at the shift destination. The spherical aberration correction actuator drive circuit 23 starts spherical aberration correction operation so that the spherical aberration correction amount becomes the state L421 while continuing the focus control operation.

Then at the timing T54, the interlayer shift procedure instruction unit 57 detects that the signal 403 to indicate the spherical aberration correction amount reached the state L425, and executes the focus jump operation while continuing the spherical aberration correction operation, to shift the focal point position of the light beam from the third recording layer L2 to the second recording layer L1.

In other words, until the spherical aberration becomes the optimum for the second recording layer L1, the interlayer shift procedure instruction unit 57 determines whether the spherical aberration correction amount of the spherical aberration correction unit 7 monitored by the spherical aberration correction amount monitoring unit 58 reached the spherical aberration correction amount calculated by the spherical aberration correction amount calculation unit 56 (spherical aberration correction amount corresponding to the spherical aberration correction position SAtgt2). If it is determined that the spherical aberration correction amount of the spherical aberration correction unit 7 reached the spherical aberration correction amount calculated by the spherical aberration correction amount calculation unit 56, then the interlayer shift procedure instruction unit 57 instructs the focus actuator drive circuit 21 to shift the focal point position to the adjacent second recording layer L1.

In concrete terms, until the spherical aberration becomes the optimum for the second recording layer L1, the interlayer shift procedure instruction unit 57 determines whether the position of the spherical aberration correction element of the spherical aberration correction unit 7 monitored by the spherical aberration correction amount monitoring unit 58 reached the position of the spherical aberration correction element calculated by the spherical aberration correction amount calculation unit 56 (position of the spherical aberration correction element corresponding to the spherical aberration correction position SAtgt2). If it is determined that the position of the spherical aberration correction element of the spherical aberration correction unit 7 reached the position of the spherical aberration correction element calculated by the spherical aberration correction amount calculation unit 56, the interlayer shift procedure instruction unit 57 instructs the focus actuator drive circuit 21 to shift the focal point position to the adjacent second recording layer L1.

Then at the timing T55, the microcomputer 51 checks whether the focus control is operating accurately. Then at the timing T56, if the spherical aberration correction amount reached the state L421, the spherical aberration correction actuator drive circuit 23 completes the spherical aberration correction operation.

Finally at the timing T57, the microcomputer 51 checks whether the focus control is operating accurately, and completes the interlayer shift operation.

In Embodiment 3, a method for constantly monitoring the drive amount of the stepping motor is shown as a method for monitoring the spherical aberration correction amount by the spherical aberration correction amount monitoring unit 58, but the present invention is not limited to this. For example, a sensor for detecting the spherical aberration correction amount (position of spherical aberration correction element) may be installed separately. Or the spherical aberration correction amount monitoring unit 58 may detect the spherical aberration amount by computing a signal acquired from the light receiving unit 5.

According to the procedure of focus jump of Embodiment 3, it is unnecessary to interrupt temporarily the spherical aberration correction operation for the focus jump operation, so a faster interlayer shift can be implemented.

Embodiment 4

An optical disc apparatus according to Embodiment 4 of the present invention will now be described.

Description on the configuration of the optical disc apparatus according to Embodiment 4, which is the same as Embodiment 3, is omitted.

In Embodiment 3, the interlayer shift from the current recording layer to another recording layer which adjoins to the current recording layer was described. Whereas in Embodiment 4, a procedure upon an interlayer shift to a recording layer, which is two or more layers away from the current recording layer, so that a plurality of recording layers are continuously shifted at high-speed and stably, will be described. Here a procedure of focus jump from the fourth recording layer L3 to the first recording layer L0 will be described with reference to FIG. 10.

Figure 10:
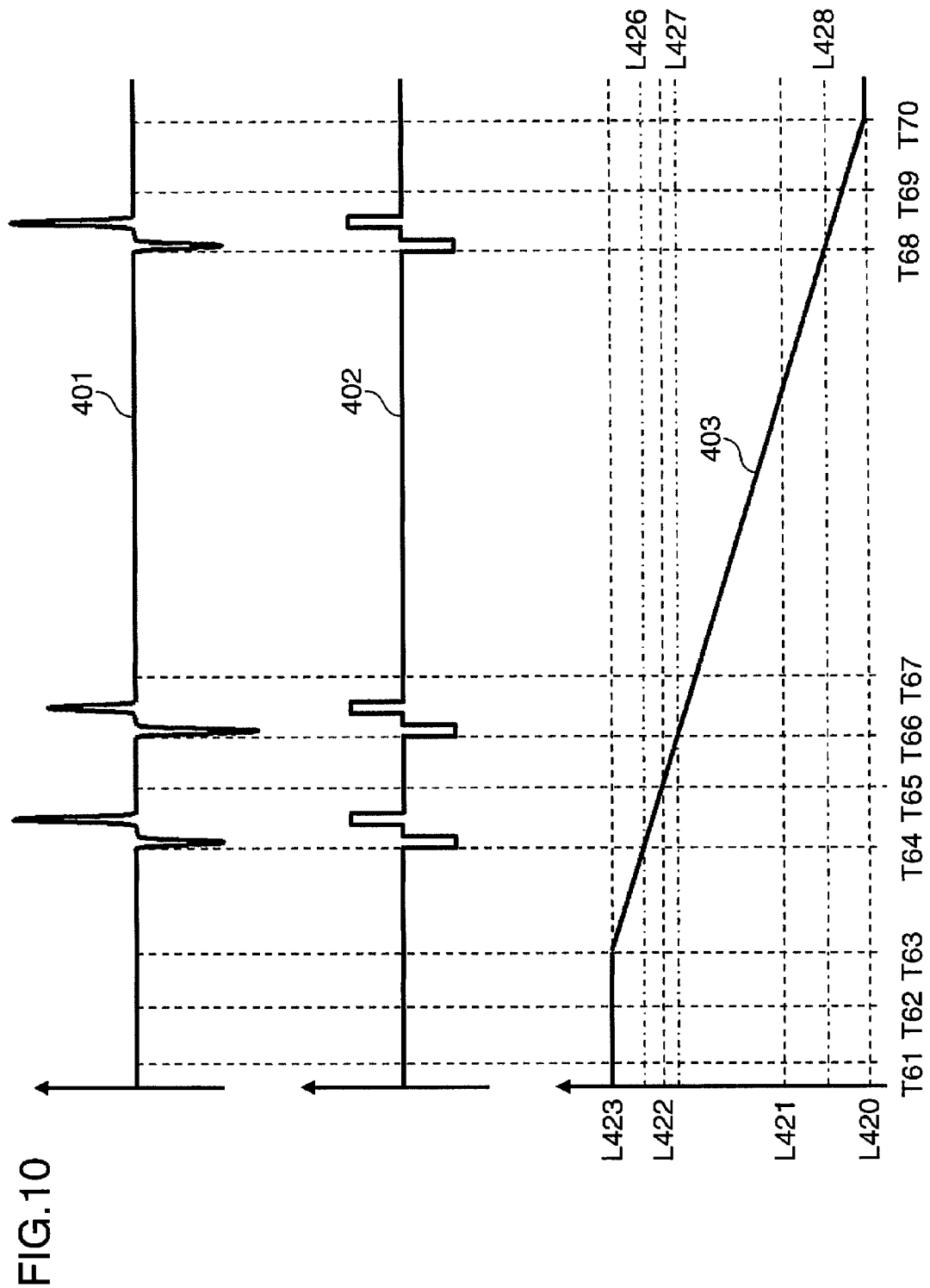
FIG. 10 are graphs showing the change of a focus error signal, focus actuator drive output and a signal to indicate the spherical aberration correction amount upon interlayer shift from the fourth recording layer to the first recording layer according to Embodiment 4.

FIG. 10 are graphs depicting the change of the focus error signal 401, focus actuator drive output 402 and the signal 403 to indicate the spherical aberration correction amount upon interlayer shifting from the fourth recording layer L3 to the first recording layer L0 according to Embodiment 4.

First at the timing T61, the signal 403 to indicate the spherical aberration correction amount is in the state L423 when the recording or reproducing operation is in-progress in the fourth recording layer L3.

Then at the timing T62, the spherical aberration correction amount calculation unit 56 calculates the spherical aberration correction amount upon executing focus jump based on the interlayer distance among recording layers. The spherical aberration correction amount calculation unit 56 calculates the spherical aberration correction position for correcting the spherical aberration, and calculates the spherical aberration correction amount for correcting the spherical aberration so that the spherical aberration becomes smallest in the calculated spherical aberration correction position. In Embodiment 4 as well, the spherical aberration correction amount indicates a position of the spherical aberration correction element where the spherical aberration is the optimum.

In the case of shifting from the current recording layer to a recording layer two or more layers away, the spherical aberration correction amount calculation unit 56 calculates the spherical aberration correction position for each recording layer which exists between the current recording layer and the recording layer at the shift destination, and calculates the spherical aberration correction amount corresponding to the spherical aberration correction position.

The spherical aberration correction amount calculation unit 56 calculates the spherical aberration correction position SAtgt2 upon executing the focus jump operation from the fourth recording layer L3 to the third recording layer L2 using the following Expression (7). Here SAtgt is an interlayer distance from the surface to the third recording layer L2, ΔSA1 is an interlayer distance from the fourth recording layer L3 to the third recording layer L2, ΔSA2 is an interlayer distance from the fourth recording layer L3 to the surface, and K is a correction coefficient of the interlayer distance.

$$SAtgt2 = SAtgt - (\Delta SA1/\Delta SA2) \times K \quad (7)$$

For example, if the interlayer distance SAtgt is 63 μm, the interlayer distance ΔSA1 is 13 μm, the interlayer distance ΔSA2 is 50 μm, and the correction coefficient K is 10, the spherical aberration correction position SAtgt2 is calculated by the following Expression (8).

$$SAtgt2 = 63 - (13/50) \times 10 = 60.4 \quad (8)$$

In the same manner, the spherical aberration correction amount calculation unit 56 calculates the spherical aberration correction position SAtgt3 upon executing the focus jump operation from the third recording layer L2 to the second recording layer L1 using the following Expression (9). Here SAtgt is an interlayer distance from the surface to the second recording Layer L1, ΔSA1 is an interlayer distance from the third recording layer L2 to the second recording layer L1, ΔSA2 is an interlayer distance from the third recording layer L2 to the fourth recording layer L3, and K is a correction coefficient of an interlayer distance.

$$SAtgt3 = SAtgt - (\Delta SA1/\Delta SA2) \times K \quad (9)$$

For example, if the interlayer distance SAtgt is 83 μm, the interlayer distance ΔSA1 is 20 μm, the interlayer distance ΔSA2 is 13 μm, and the correction coefficient K is 10, the spherical aberration correction position SAtgt3 is calculated by the following Expression (10).

$$SAtgt3 = 83 - (20/13) \times 10 = 67.6 \quad (10)$$

Furthermore, the spherical aberration correction amount calculation unit 56 calculates the spherical aberration correction position SAtgt4 upon executing the focus jump operation from the second recording layer L1 to the first recording layer L0 using the following Expression (11). Here SAtgt is an interlayer distance from the surface to the first recording layer L0, ΔSA1 is an interlayer distance from the second recording layer L1 to the first recording layer L0, ΔSA2 is an interlayer distance from the second recording layer L1 to the third recording layer L2, and K is a correction coefficient of an interlayer distance.

$$SAtgt4 = SAtgt - (\Delta SA1/\Delta SA2) \times K \quad (11)$$

For example, if the interlayer distance SAtgt is 100 μm, the interlayer distance ΔSA1 is 17 μm, the interlayer distance ΔSA2 is 20 μm, and the correction coefficient K is 10, the spherical aberration correction position SAtgt4 is calculated by the following Expression (12).

$$SAtgt4 = 100 - (17/20) \times 10 = 91.5 \quad (12)$$

In this way, upon executing the focus jump from the fourth recording layer L3 to the third recording layer L2, the spherical aberration correction actuator drive circuit 23 adjusts the spherical aberration correction amount to the state L426 which is the optimum for the spherical aberration correction position, which is 60.4 μm from the surface. Upon executing the focus jump from the third recording layer L2 to the second recording layer L1, the spherical aberration correction actuator drive circuit 23 adjusts the spherical aberration correction amount to the state L427 which is the optimum for the spherical aberration correction position, which is 67.6 μm from the surface. Furthermore, upon executing the focus jump from the second recording layer L1 to the first recording layer L0, the spherical aberration correction actuator drive circuit 23 adjusts the spherical aberration correction amount to the state L428 which is the optimum for the spherical aberration correction position, which is 91.5 μm from the surface.

Then at the timing T63, the interlayer shift procedure instruction unit 57 instructs the spherical aberration correction actuator drive circuit 23 to correct the spherical aberration according to the spherical aberration correction amount corresponding to the first recording layer L0 at the shift destination. The spherical aberration correction actuator drive circuit 23 starts the spherical aberration correction operation so that the spherical aberration correction amount becomes the state L420 while continuing the focus control operation.

Then at the timing T64, the interlayer shift procedure instruction unit 57 detects that the signal 403 to indicate the spherical aberration correction amount reached the state L426, and executes the focus jump operation while continuing the spherical aberration correction operation, so as to shift the focal point position of the light beam from the fourth recording layer L3 to the third recording layer L2.

In other words, until the spherical aberration becomes the optimum for the first recording layer L0, the interlayer shift procedure instruction unit 57 determines whether the spherical aberration correction amount of the spherical aberration correction unit 7 monitored by the spherical aberration correction amount monitoring unit 58 reached the spherical aberration correction amount (spherical aberration correction amount corresponding to the spherical aberration correction position SAtgt2) calculated by the spherical aberration correction amount calculation unit 56. If it is determined that the spherical aberration correction amount of the spherical aberration correction unit 7 reached the spherical aberration correction amount calculated by the spherical aberration correction amount calculation unit 56, the interlayer shift procedure instruction unit 57 instructs the focus actuator drive circuit 21 to shift the focal point position to the adjacent third recording layer L2.

When the focus jump operation completes, the microcomputer 51 checks whether the focus control is operating accurately at the timing T65.

Then at the timing T66, the interlayer shift procedure instruction unit 57 detects that the signal 403 to indicate the spherical aberration correction amount reached the state L427, and executes the focus jump operation while continuing the spherical aberration operation, so as to shift the focal point position of the light beam from the third recording layer L2 to the second recording Layer L1.

In other words, until the spherical aberration becomes the optimum for the first recording layer L0, the interlayer shift procedure instruction unit 57 determines whether the spherical aberration correction amount of the spherical aberration correction unit 7 monitored by the spherical aberration correction amount monitoring unit 58 reached the spherical aberration correction amount (spherical aberration correction amount corresponding to the spherical aberration correction position SAtgt3) calculated by the spherical aberration correction amount calculation unit 56. If it is determined that the spherical aberration correction amount of the spherical aberration correction unit 7 reached the spherical aberration correction amount calculated by the spherical aberration correction amount calculation unit 56, the interlayer shift procedure instruction unit 57 instructs the focus actuator drive circuit 21 to shift the focal point position to the adjacent second recording layer L1.

When the focus jump operation completes, the microcomputer 51 checks whether the focus control is operating accurately at the timing T67.

Then at the timing T68, the interlayer shift procedure instruction unit 57 detects the signal 403 to indicate the spherical aberration correction amount reached the state L428, and executes the focus jump operation while continuing the spherical aberration correction operation, so as to shift the focal point position of the light beam from the second recording layer L1 to the first recording layer L0.

In other words, until the spherical aberration becomes the optimum for the first recording layer L0, the interlayer shift procedure instruction unit 57 determines whether the spherical aberration correction amount of the spherical aberration correction unit 7 monitored by the spherical aberration correction amount monitoring unit 58 reached the spherical aberration correction amount (spherical aberration correction amount corresponding to the spherical aberration correction position SAtgt4) calculated by the spherical aberration correction amount calculation unit 56. If it is determined that the spherical aberration correction amount of the spherical aberration correction unit 7 reached the spherical aberration correction amount calculated by the spherical aberration correction amount calculation unit 56, the interlayer shift procedure instruction unit 57 instructs the focus actuator drive circuit 21 to shift the focal point position to the adjacent first recording layer L0.

When the focus jump operation completes, the microcomputer 51 checks whether focus control is operating accurately at the timing T69.

Finally if the spherical aberration correction amount reaches the state L420 at the timing T70, the spherical aberration correction actuator drive circuit 23 completes the spherical aberration correction operation, and the focus actuator drive circuit 21 completes the interlayer shift operation.

In this way, by repeating the operation to detect that the current spherical aberration correction amount reached a predetermined spherical aberration correction amount and execute the focus jump operation while continuing the spherical aberration correction operation, a stable and high-speed interlayer shift can be implemented even in a multilayer optical disc in which the interlayer distance among recording layers is different.

In the above described embodiments, an invention having the following configuration is primarily included.

An optical disc apparatus according to an aspect of the present invention is an optical disc apparatus which irradiates a light beam onto an optical disc having a plurality of recording layers so as to read information recorded on the optical disc or record information on the optical disc, the optical disc apparatus having: a spherical aberration correction unit which corrects spherical aberration generated in a light spot on each of the recording layers; a focus control unit which focuses the light beam on a predetermined recording layer; a focus jump unit which shifts a focal point position of the light beam from a current recording layer to another recording layer; and a focus jump control unit which controls correction of spherical aberration by the spherical aberration correction unit and shift of the focal point position by the focus jump unit based on the interlayer distance between the current recording layer and a recording layer which adjoins in the direction the opposite to the direction of shifting the focal point position of the light beam.

According to this configuration, correction of the spherical aberration generated in a light spot on the recording layer and the shift of the focal point position of the light beam are controlled based on the interlayer distance between the current recording layer and the recording layer which adjoins in the direction the opposite to the direction of shifting the focal point position of the light beam.

Since the correction of the spherical aberration and shift of the focal point position are controlled based on the interlayer distance between the current recording layer and the recording layer which adjoins in the direction the opposite to the direction of shifting the focal point position of the light beam, the influence from the adjacent recording layers on the focal error signal can be considered, and a stable focus jump can be executed.

In the above optical disc apparatus, it is preferable that the focus jump control unit determines which one of the correction of spherical aberration by the spherical aberration correction unit and the shift of the focal point position by the focus jump unit is executed first, based on the interlayer distance between the current recording layer and the recording layer which adjoins in the direction the opposite to the direction of shifting the focal point position of the light beam.

According to this configuration, it is determined which one of the correction of the spherical aberration or the shift of the focal point position is executed first, based on the interlayer distance between the current recording layer and the recording layer which adjoins in the direction the opposite to the direction of shifting the focal point position of the light beam.

Therefore the focal point position can be shifted after correcting the spherical aberration if the adjacent recording layer influences the focus error signal, and the spherical aberration can be corrected after shifting the focal point position if the adjacent recording layer does not influence the focus error signal, whereby focus jump can be executed stably.

In the above optical disc apparatus, it is preferable that the focus jump control unit compares the interlayer distance between the current recording layer and the recording layer which adjoins in the direction the opposite to the direction of shifting the focal point position of the light beam, and a predetermined threshold, and shifts the focal point position after correcting the spherical aberration when the interlayer distance is greater than the threshold, and corrects the spherical aberration after shifting the focal point position when the interlayer distance is the threshold or less.

According to this configuration, the interlayer distance between the current recording layer and the recording layer which adjoins in the direction the opposite to the direction of shifting the focal point position of the light beam and a predetermined threshold are compared. If the interlayer distance is greater than the threshold, the focal point position is shifted after correcting the spherical aberration. If the interlayer distance is the threshold or less, the spherical aberration is corrected after shifting the focal point position.

Therefore the focal point position can be shifted after correcting the spherical aberration if the adjacent recording layer influences the focal error signal, and the spherical aberration can be corrected after shifting the focal point position if the adjacent recording layer does not influence the focus error signal, whereby focus jump can be executed stably.

In the above optical disc apparatus, it is preferable that the focus jump control unit controls the correction of spherical aberration by the spherical aberration correction unit and the shift of the focal point position by the focus jump unit and the shift of the focal point position by the focus jump unit, based on the interlayer distance between the current recording layer and a recording layer which exists in a predetermined distance range before or after the current recording layer.

According to this configuration, the correction of the spherical aberration and shift of the focal point position are controlled based on the interlayer distance between the current recording layer and the recording layer which exists in a predetermined distance before or after the current recording layer, therefore focus jump can be performed more stably.

In the above optical disc apparatus, it is preferable that the focus jump control unit calculates the spherical aberration correction amount for correcting the spherical aberration based on the interlayer distance between the current recording layer and the recording layer which adjoins in the direction of shifting the focal point position of the light beam, and an interlayer distance between the current recording layer and the recording layer which adjoins in the direction the opposite to the direction of shifting the focal point position of the light beam, and the spherical aberration correction unit corrects the spherical aberration according to the calculated spherical aberration correction amount.

According to this configuration, the spherical aberration correction amount for correcting the spherical aberration is calculated based on the interlayer distance between the current recording layer and the recording layer which adjoins in the direction of shifting the focal point position of the light beam, and an interlayer distance between the current recording layer and the recording layer which adjoins in the direction the opposite to the direction of shifting the focal point position of the light beam. Then the spherical aberration is corrected according to the calculated spherical aberration correction amount.

Since the spherical aberration correction amount for correcting the spherical aberration is calculated based on the interlayer distance between the current recording layer and the recording layer which adjoins in the direction of shifting the focal point position of the light beam, and an interlayer distance between the current recording layer and the recording layer which adjoins in the direction the opposite to the direction of shifting the focal point position of the light beam, the spherical aberration can be corrected accurately.

In the above optical disc apparatus, it is preferable that the focus jump control unit calculates the spherical aberration correction position, which indicates a position where the spherical aberration is corrected based on the following Expression (13), and calculates a spherical aberration correction amount for correcting the spherical aberration in the calculated spherical aberration correction position.

$$SAtgt2 = SAtgt + (\Delta SA1/\Delta SA2) \times K \quad (13)$$

Here $SAtgt2$ denotes the spherical aberration correction position, $SAtgt$ denotes a distance from the surface of the optical disc to the recording layer which adjoins in the direction of shifting the focal point position of the light beam, $\Delta SA1$ denotes the interlayer distance between the current recording layer and the recording layer which adjoins in the direction of shifting the focal point position of the light beam, $\Delta SA2$ denotes the interlayer distance between the current recording layer and the recording layer which adjoins in the direction the opposite to the direction of shifting the focal point position of the light beam, and $K$ denotes a correction coefficient.

According to this configuration, the spherical aberration correction position which indicates a position where the spherical aberration is corrected, is calculated based on the above Expression (13), and the spherical aberration correction amount for correcting the spherical aberration is calculated in the calculated spherical aberration correction position, therefore the spherical aberration can be corrected more accurately.

In the above optical disc apparatus, it is preferable that the focus jump control unit instructs the spherical aberration correction unit to correct the spherical aberration according to the calculated spherical aberration correction amount, instructs the focus jump unit to shift the focal point position of the light beam from the current recording layer to another recording layer, and instructs the spherical aberration correction unit to correct the spherical aberration in the other recording layer after the shift.

According to this configuration, the spherical aberration is corrected according to the calculated spherical aberration correction amount, then the focal point position of the light beam is shifted from the current recording layer to another recording layer, and then the spherical aberration in the other recording layer after the shift is corrected.

Since the spherical aberration is corrected in stages, the focus jump can be executed more stably.

In the above optical disc apparatus, it is preferable that when the focal point position is shifted to another recording layer which is m layers away from the current recording layer where the light beam is focused, the focus jump control unit controls the correction of spherical aberration by the spherical aberration correction unit and the shift of the focal point position by the focus jump unit so that operation to shift the focal point position to an adjacent recording layer is repeated m number of times.

According to this configuration, when the focal point position is shifted from the current recording layer where the light beam is focused to another recording layer which is m layers away, the correction of spherical aberration and shift of the focal point position are controlled so that operation to shift the focal point position to the adjacent recording layer is repeated m number of times. Since the interlayer shift to an adjacent recording layer is continuously executed, a stable interlayer shift from the current recording layer to another recording layer, which is a plurality of layers away, can be implemented.

In the above optical disc apparatus, it is preferable that the focus jump control unit has: a spherical aberration correction amount calculation unit which calculates the spherical aberration correction amount to correct the spherical aberration based on the interlayer distance between the current recording layer and the recording layer which adjoins in the direction the opposite to the direction of shifting the focal point position of the light beam; and an instruction unit which instructs the focus jump unit to shift the focal point position to an adjacent recording layer in the case of the spherical aberration reaches the spherical aberration correction amount calculated by the spherical aberration correction amount calculation unit until the time when the spherical aberration becomes the optimum in the other recording layer after correction of the spherical aberration is started so that the spherical aberration becomes the optimum in the other recording layer.

According to this configuration, the spherical aberration correction amount to correct the spherical aberration is calculated based on the interlayer distance between the current recording layer and the recording layer which adjoins in the direction the opposite to the direction of shifting the focal point position of the light beam. Then the focal point position is shifted to the adjacent recording layer in the case of the spherical aberration reaches the calculated spherical aberration correction amount until the time when the spherical aberration becomes the optimum in the other recording layer after correction of the spherical aberration is started so that the spherical aberration becomes the optimum in the other recording layer.

Therefore the focal point position can be shifted while correcting the spherical aberration, and interlayer access time can be decreased.

In the above optical disc apparatus, it is preferable that when the focal point is shifted to another recording layer which is two or more layers away from the current recording layer, the spherical aberration correction amount calculation unit calculates each spherical aberration correction amount upon shifting the focal point position to the adjacent recording layer, based on the interlayer distance between the current recording layer and the recording layer which adjoins in the direction of shifting the focal point position of the light beam, and the interlayer distance between the current recording layer and the recording layer which adjoins in the direction the opposite to the direction of shifting the focal point position of the light beam.

According to this configuration, when the focal point position is shifted from the current layer to another recording layer which is two or more layers away, each spherical aberration correction amount upon shifting the focal point position to the adjacent recording layer is calculated based on the interlayer distance between the current recording layer and the recording layer which adjoins in the direction of shifting the focal point position of the light beam, and the interlayer distance between the current recording layer and the recording layer which adjoins in the direction the opposite to the direction of shifting the focal point position of the light beam.

Therefore even in the case of shifting the focal point position from the current recording layer to another recording layer which is two or more layers away, the focal point position can be shifted while correcting the spherical aberration, and the interlayer access time can be decreased.

It is preferable that the above optical disc apparatus further comprises: an interlayer distance acquisition unit which acquires an interlayer distance among recording layers of the optical disc, wherein the interlayer distance acquisition unit acquires the interlayer distance based on the standard value of the optical disc. According to this configuration, the interlayer distance can be acquired based on the standard values of the optical disc.

It is preferable that the above optical disc apparatus further comprises: an interlayer distance acquisition unit which acquires an interlayer distance among recording layers of the optical disc, wherein the interlayer distance acquisition unit acquires the interlayer distance based on the standard value corresponding to the type of the optical disc. According to this configuration, the interlayer distance can be acquired based on the standard value corresponding to the type of optical disc.

It is preferable that the above optical disc apparatus further comprises: an interlayer distance acquisition unit which acquires an interlayer distance among recording layers of the optical disc; an objective lens which collects the light beam on the recording layer; a drive unit which drives the objective lens in the optical axis direction in order to focus the light beam on a predetermined recording layer; and a focus error signal generation unit which generates a relative distance between the focal point position of the light beam and a recording layer of the optical disc as a focus error signal, wherein the interlayer distance acquisition unit detects the focus error signal which is generated by the focus error signal generation unit while driving the objective lens in the optical axis direction by the drive unit at a predetermined speed, and acquires the interlayer distance based on detection timing of the focus error signal.

According to this configuration, the generated focus error signal is detected while driving the objective lens in the optical axis direction at a predetermined speed, and the interlayer distance is acquired based on the detection timing of the focus error signal. Therefore the interlayer distance can be accurately acquired for each optical disc.

It is preferable that the above optical disc apparatus further comprises: an interlayer distance acquisition unit which acquires an interlayer distance among recording layers of the optical disc; and a tracking error signal generation unit which generates a relative distance between the focal point position of the light beam and a track formed on the optical disc as a tracking error signal, wherein the interlayer distance acquisition unit acquires the interlayer distance based on the correction amount of the spherical aberration in a position where the amplitude of the tracking error signal generated in each recording layer of the optical disc is the highest.

According to this configuration, the interlayer distance is acquired based on the correction amount of the spherical aberration in a position where the amplitude of the tracking error signal generated in each recording layer of the optical disc is the highest. Therefore the interlayer distance can be acquired accurately for each optical disc.

It is preferred that the above optical disc apparatus further comprises: an interlayer distance acquisition unit which acquires an interlayer distance among recording layers of the optical disc; and a reproducing signal quality index generation unit which reproduces information recorded in each recording layer of the optical disc and generates a reproducing signal quality index, wherein the interlayer distance acquisition unit acquires the interlayer distance based on the correction amount of the spherical aberration with which the reproducing signal quality index generated by reproducing the recorded area of each recording layer of the optical disc becomes the best.

According to this configuration, the interlayer distance is acquired based on the correction amount of the spherical aberration with which the reproducing signal quality index generated by reproducing the recorded area of each recording layer of the optical disc becomes the best. Therefore the interlayer distance can be acquired accurately for each optical disc.

A focus control method according to another aspect of the present invention is a focus control method for shifting a focal point position of a light beam irradiated onto an optical disc having a plurality of recording layers from a current recording layer to another recording layer, comprising: a focus control step of focusing the light beam on a predetermined recording layer of the optical disc; and a focus jump control step of controlling correction of spherical aberration generated in the light spot on the recording layer and a shift of a focal point position of the light beam, based on an interlayer distance between the current recording layer and a recording layer which adjoins in the direction the opposite to the direction of shifting the focal point position of the light beam.

According to this configuration, correction of the spherical aberration generated in a light spot on the recording layer and the shift of the focal point position of the light beam are controlled based on the interlayer distance between the current recording layer and the recording layer which adjoins in the direction the opposite to the direction of shifting the focal point position of the light beam.

Since the correction of the spherical aberration and shift of the focal point position are controlled based on the interlayer distance between the current recording layer and the recording layer which adjoins in the direction the opposite to the direction of shifting the focal point position of the light beam, the influence from the adjacent recording layers on the focus error signal can be considered, and a stable focus jump can be executed.

An integrated circuit according to another aspect of the present invention is an integrated circuit for shifting a focal point position of a light beam, which is irradiated onto an optical disc having a plurality of recording layers, from a current recording layer to another recording layer, comprising: a focus control circuit which focuses a light beam on a predetermined recording layer of the optical disc; and a focus jump control circuit which controls correction of spherical aberration which is generated in the light spot on the recording layer, and shift of the focal point position of the light beam, based on the interlayer distance between the current recording layer and a recording layer which adjoins in the direction the opposite to the direction of shifting the focal point position of the light beam.

According to this configuration, correction of the spherical aberration generated in a light spot on the recording layer and the shift of the focal point position of the light beam are controlled based on the interlayer distance between the current recording layer and the recording layer which adjoins in the direction the opposite to the direction of shifting the focal point position of the light beam.

Since the correction of the spherical aberration and shift of the focal point position are controlled based on the interlayer distance between the current recording layer and the recording layer which adjoins in the direction the opposite to the direction of shifting the focal point position of the light beam, the influence from the adjacent recording layers on the focus error signal can be considered, and a stable focus jump can be executed.

For any of the embodiments described above, a more stable focus jump can be executed by changing the drive waveform, which is output by the focus actuator drive circuit 21, according to the interlayer distance to execute the focus jump. This can be implemented, for example, by the focus actuator drive circuit 21 appropriately correcting the output level or output time of the drive waveform according to the length of the interlayer distance.

Depending on the type of multilayer optical disc, the output of an optimum light beam may be different in each recording layer. Also depending on the recording layer of the multilayer optical disc, a high frequency component may be superimposed upon the light beam output by the laser light source, in order to improve the signal characteristics, which is acquired by reflection from the multilayer optical disc.

In the case of executing focus jump from a recording layer in which output of the optimum light beam is high to a recording layer in which output of the optimum light beam is low, if the focus jump is executed without changing the output of the light beam, information in the recording layer at the shift destination may deteriorate or information in the recording layer at the shift destination may be deleted in error.

In such a case, the control unit sets the output of the light beam according to the current recording layer or the recording layer at the shift destination, whichever is lower in output of the optimum light beam. Thereby deterioration of information in the recording layer can be prevented in a multilayer optical disc in which the output of the optimum light beam differs depending on the recording layer.

In the case of executing focus jump from a recording layer from which information is reproduced by a light beam, on which a high frequency component is superimposed, to a recording layer from which information is reproduced by a light beam, on which a high frequency component is not superimposed, the information in the recording layer at the shift destination may deteriorate or information in the recording layer at the shift destination may be deleted in error if focus jump is executed in a state of a high frequency component being superimposed.

In such a case, the control unit stops superimposing the high frequency component on the light beam before executing the focus jump operation. Thereby deterioration of the information in the recording layer can be prevented in a multilayer optical disc where a recording layer from which information is reproduced by a light beam, on which a high frequency component is superimposed, and a recording layer from which information is reproduced by a light beam, on which a high frequency component is not superimposed, coexist.

It is preferable that the output of the light beam is decreased in advance upon correcting the spherical aberration as well. If the position of an optical element in the optical pickup is changed, the output of the light beam irradiated onto the multilayer optical disc may change, even if the drive current to be supplied to the laser light source is constant. Hence the control unit sets a value optimum for the recording layer at the shift destination for the output of the light beam according to the spherical aberration correction amount, after focus jump completes, whereby deterioration in the recording layer can be prevented.

The control unit may execute focus jump after setting the output of the light beam according to the recording layer of which the optimum output of the light beam is the lowest, among the plurality of recording layers of the multilayer optical disc. Thereby deterioration of the information in the recording layer can be prevented, even if the focus jump is executed in error, to a recording layer which is different from the target. In this case, the control unit may execute focus jump after setting the amplitude of a high frequency component to be superimposed on the light beam according to the recording layer of which optimum output of the light beam is the lowest among a plurality of recording layers of the multilayer optical disc, or may execute focus jump after stopping superimposing the high frequency component. Thereby even if focus jump is executed in error to a recording layer which is different from the target, deterioration of information in the recording layer because the peak power of the light beam, which is increased by superimposing a high frequency component, can be prevented.

The control unit may confirm success of focus jump to a desired recording layer by measuring the amplitude of the tracking error signal, and comparing this with a predetermined threshold after jump focus is completed. The control unit may confirm the success of focus jump to a desired recording layer by reading the address of the recording layer after the shift when jump focus is completed. Then the control unit sets an optimum output of the light beam for the current recording layer. Or if the current recording layer is a recording layer from which information is reproduced by the light beam on which a high frequency component is superimposed, the control unit superimposes the high frequency component on the light beam. Thereby both reliability of the multilayer optical disc and high-speed and stable access operation can be implemented.

The embodiments and examples described in the section "Description of Embodiments" are to clarify the technical content of the present invention, and the present invention should not be interpreted in a narrow sense, limited to the embodiments, and numerous modifications can be made without departing from the spirit of the invention and the scope of the claims.

INDUSTRIAL APPLICABILITY

The optical disc apparatus, focus control method and integrated circuit according to the present invention can implement a stable and high-speed focus jump operation, even in a multilayer optical disc having a plurality of recording layers, and are useful as an optical disc apparatus, focus control method and integrated circuit for reading information recorded in a multilayer optical disc which implements large capacity and high recording density, or recording information to this optical disc.

The invention claimed is:

1. An optical disc apparatus which irradiates a light beam onto an optical disc having a plurality of recording layers so as to read information recorded on the optical disc or record information on the optical disc, the optical disc apparatus, comprising:
a spherical aberration correction unit which corrects spherical aberration generated in a light spot on each of the recording layers;
a focus control unit which focuses the light beam on a predetermined recording layer of the recording layers;
a focus jump unit which shifts a focal point position of the light beam from a first recording layer of the recording layers where the light beam is currently focused to a second recording layer of the recording layers, which different from the first recording layer; and
a focus jump control unit which controls, when the focus jump unit shifts the focal point position from the first recording layer to the second recording layer, a correction of the spherical aberration by the spherical aberration correction unit and the shift of the focal point position by the focus jump unit (i) based on an interlayer distance between the first recording layer and a third recording layer of the recording layers which adjoins the first recording layer in a direction opposite to a direction of the shifting of the focal point position of the light beam and (ii) not based on another interlayer distance between the first recording layer and the second recording layer.

2. The optical disc apparatus according to claim 1, wherein when the focus jump unit shifts the focal point position from the first recording layer to the second recording layer, the focus jump control unit determines which one of the correction of spherical aberration by the spherical aberration correction unit and the shift of the focal point position by the focus jump unit is executed first, based on the interlayer distance between the first recording layer and the third recording layer.

3. The optical disc apparatus according to claim 2, wherein when the focus jump unit shifts the focal point position from the first recording layer to the second recording layer, the focus jump control unit compares the interlayer distance between the first recording layer and the third recording layer, which adjoins in the direction opposite to the direction of shifting the focal point position of the light beam, and a predetermined threshold, and shifts the focal point position after correcting the spherical aberration when the interlayer distance is greater than the predetermined threshold, and corrects the spherical aberration after shifting the focal point position when the interlayer distance is the predetermined threshold or less.

4. The optical disc apparatus according to claim 1, wherein the focus jump control unit controls the correction of the spherical aberration by the spherical aberration correction unit and the shift of the focal point position by the focus jump unit, based on the interlayer distance between the first recording layer and the third recording layer, and an interlayer distance between the first recording layer and a fourth recording layer of the recording layers located after the first recording layer in the direction of shifting the focal point position of the light beam, the respective interlayer distances being in a predetermined distance range from the first recording layer.

5. The optical disc apparatus according to claim 1, wherein the focus jump control unit calculates a spherical aberration correction amount for correcting the spherical aberration based on the interlayer distance between the first recording layer and a fourth recording layer of the recording layers which adjoins the first recording layer in the direction of shifting the focal point position of the light beam, and the interlayer distance between the first recording layer and the third recording layer, and
the spherical aberration correction unit corrects the spherical aberration according to the calculated spherical aberration correction amount.

6. The optical disc apparatus according to claim 5, wherein the focus jump control unit calculates a spherical aberration correction position, which indicates a position where the spherical aberration is corrected based on Expression (1), and calculates the spherical aberration correction amount for correcting the spherical aberration in the calculated spherical aberration correction position:

$$SAtgt2 = SAtgt + (\Delta SA1/\Delta SA2) \times K \qquad \text{Expression (1)}$$

where, SAtgt2 denotes the spherical aberration correction position, SAtgt denotes a distance from a surface of the optical disc to the fourth recording layer, $\Delta SA1$ denotes the interlayer distance between the first recording layer and the fourth recording layer, $\Delta SA2$ denotes the interlayer distance between the first recording layer and the third recording layer, and K denotes a correction coefficient.

7. The optical disc apparatus according to claim 5, wherein the focus jump control unit instructs the spherical aberration correction unit to correct the spherical aberration according to the calculated spherical aberration correction amount, instructs the focus jump unit to shift the focal point position of the light beam from the first recording layer to the second recording layer, and instructs the spherical aberration correction unit to correct the spherical aberration in the second recording layer after the shift.

8. The optical disc apparatus according to claim 1, wherein when the focal point position is shifted to the second recording layer which is m layers away from the first recording layer where the light beam is focused, the focus jump control unit controls the correction of spherical aberration by the spherical aberration correction unit and the shift of the focal point position by the focus jump unit so that an operation to shift the focal point position to an adjacent recording layer is repeated m number of times.

9. The optical disc apparatus according to claim 1, wherein the focus jump control unit comprises:
 a spherical aberration correction amount calculation unit which calculates the spherical aberration correction amount to correct the spherical aberration based on the interlayer distance between the first recording layer and the third recording layer; and
 an instruction unit which instructs the focus jump unit to shift the focal point position to an adjacent recording layer when the spherical aberration reaches the spherical aberration correction amount calculated by the spherical aberration correction amount calculation unit until a time when the spherical aberration becomes the optimum in the second recording layer after the correction of the spherical aberration is started so that the spherical aberration becomes the optimum in the second recording layer.

10. The optical disc apparatus according to claim 9, wherein when the focal point position is shifted to the second recording layer which is two or more layers away from the first recording layer, the spherical aberration correction amount calculation unit calculates each spherical aberration correction amount upon shifting the focal point position to the adjacent recording layer, based on an interlayer distance between the first recording layer and a fourth recording layer of the recording layers which adjoins the first recording layer in the direction of shifting the focal point position of the light beam, and the interlayer distance between the first recording layer and the third recording layer.

11. The optical disc apparatus according to claim 1, further comprising an interlayer distance acquisition unit which acquires an interlayer distance among recording layers of the optical disc, wherein
 the interlayer distance acquisition unit acquires the interlayer distance based on a standard value of the optical disc.

12. The optical disc apparatus according to claim 1, further comprising an interlayer distance acquisition unit which acquires an interlayer distance among recording layers of the optical disc, wherein
 the interlayer distance acquisition unit acquires the interlayer distance based on a standard value corresponding to a type of the optical disc.

13. The optical disc apparatus according to claim 1, further comprising:
 an interlayer distance acquisition unit which acquires an interlayer distance among recording layers of the optical disc;
 an objective lens which collects the light beam on a recording layer of the recording layers;
 a drive unit which drives the objective lens in an optical axis direction in order to focus the light beam on a predetermined recording layer of the recording layers; and
 a focus error signal generation unit which generates a relative distance between the focal point position of the light beam and a recording layer of the optical disc as a focus error signal, wherein
 the interlayer distance acquisition unit detects the focus error signal which is generated by the focus error signal generation unit while driving the objective lens in the optical axis direction by the drive unit at a predetermined speed, and acquires the interlayer distance based on detection timing of the focus error signal.

14. The optical disc apparatus according to claim 1, further comprising:
 an interlayer distance acquisition unit which acquires an interlayer distance among recording layers of the optical disc; and
 a tracking error signal generation unit which generates a relative distance between the focal point position of the light beam and a track formed on the optical disc as a tracking error signal, wherein
 the interlayer distance acquisition unit acquires the interlayer distance based on the correction amount of the spherical aberration in a position where an amplitude of the tracking error signal generated in each recording layer of the optical disc is highest.

15. The optical disc apparatus according to claim 1, further comprising:
 an interlayer distance acquisition unit which acquires an interlayer distance among recording layers of the optical disc; and
 a reproducing signal quality index generation unit which reproduces information recorded in each recording layer of the optical disc and generates a reproducing signal quality index, wherein
 the interlayer distance acquisition unit acquires the interlayer distance based on the correction amount of the spherical aberration with which the reproducing signal quality index generated by reproducing a recorded area of each recording layer of the optical disc becomes best.

16. A focus control method for shifting a focal point position of a light beam irradiated onto an optical disc having a plurality of recording layers from a first recording layer of the recording layers to a second recording layer of the recording layers, which is different from the first recording layer, the focus control method comprising:
 a focus control step of focusing the light beam on a predetermined recording layer of the recording layers of the optical disc; and
 a focus jump control step of controlling, when a focal point position of the light beam is shifted from the first recording layer to the second recording layer, a correction of spherical aberration which is generated in a light spot on the second recording layer and the shift of the focal point position of the light beam (i) based on an interlayer distance between the first recording layer and a third recording layer of the recording layers which adjoins the first recording layer in a direction opposite to a direction of the shifting of the focal point position of the light beam, and (ii) not based on another interlay distance between the first recording layer and the second recording layer.

17. An integrated circuit for shifting a focal point position of a light beam, which is irradiated onto an optical disc having a plurality of recording layers, from a first recording layer of the recording layers to a second recording layer of the recording layers, which is different from the first recording layer, the integrated circuit comprising:
- a focus control circuit which focuses a light beam on a predetermined recording layer of the recording layers of the optical disc; and
- a focus jump control circuit which controls, when a focal point position of the light beam is shifted from the first recording layer to the second recording layer, a correction of spherical aberration which is generated in a light spot on the second recording layer and the shift of the focal point position of the light beam (i) based on an interlayer distance between the first recording layer and a third recording layer of the recording layers which adjoins the first recording layer in a direction opposite to a direction of the shifting of the focal point position of the light beam, and (ii) not based on another interlay distance between the first recording layer and the second recording layer.

* * * * *